US009875173B2

(12) United States Patent
Marron et al.

(10) Patent No.: US 9,875,173 B2
(45) Date of Patent: Jan. 23, 2018

(54) TIME TRAVEL DEBUGGING IN MANAGED RUNTIME

(71) Applicant: Microsoft Corporation, Redmond, WA (US)

(72) Inventors: Mark Marron, Bellevue, WA (US); Earl Theodore Barr, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 14/319,092

(22) Filed: Jun. 30, 2014

(65) Prior Publication Data

US 2015/0378870 A1    Dec. 31, 2015

(51) Int. Cl.
G06F 9/44      (2006.01)
G06F 11/36     (2006.01)

(52) U.S. Cl.
CPC ................... *G06F 11/362* (2013.01)

(58) Field of Classification Search
CPC .................................................. G06F 11/3636
USPC .................................................. 717/124, 135
See application file for complete search history.

(56) References Cited

U.S. PATENT DOCUMENTS

| | | | | |
|---|---|---|---|---|
| 5,893,086 | A * | 4/1999 | Schmuck | G06F 11/1435 |
| 6,327,701 | B2 * | 12/2001 | Ungar | G06F 11/0718 |
| | | | | 707/999.101 |
| 6,502,111 | B1 * | 12/2002 | Dussud | G06F 12/0269 |
| 7,089,272 | B1 * | 8/2006 | Garthwaite | G06F 12/0276 |
| 7,150,006 | B2 * | 12/2006 | Bliss | G06F 11/3624 |
| | | | | 714/E11.207 |
| 2002/0087949 | A1 * | 7/2002 | Golender | G06F 9/4446 |
| | | | | 717/124 |
| 2006/0155791 | A1 * | 7/2006 | Tene | G06F 12/0269 |
| 2008/0243968 | A1 * | 10/2008 | Schmelter | G06F 12/0253 |
| 2008/0301417 | A1 * | 12/2008 | Law | G06F 9/3863 |
| | | | | 712/227 |

(Continued)

OTHER PUBLICATIONS

Reichenbach, et al., "What Can the GC Compute Efficiently? A Language for Heap Assertions at GC Time", Retrieved at: <<http://cgi.di.uoa.gr/~smaragd/gcassert.pdf>>, In Companion to 25th Annual ACM SIGPLAN Conference on Object-Oriented Programming, Systems, Languages, and Applications, Oct. 17, 2010, 14 pages.

(Continued)

*Primary Examiner* — Duy Khuong Nguyen
(74) *Attorney, Agent, or Firm* — Medley, Behrens & Lewis, LLC

(57) ABSTRACT

Various technologies described herein pertain to time travel debugging in a managed runtime system. The managed runtime system can include an execution component that executes a managed program component. Moreover, the managed runtime system can include a time travel debugger component. The time travel debugger component can be configured to record a sequence of live-object snapshots of program states during execution of the managed program component. A live-object snapshot can include live objects from a heap in memory at a given time during the execution. Moreover, the time travel debugger component can be configured to replay at least a portion of the execution of the managed program component based upon the live-object snapshots.

20 Claims, 13 Drawing Sheets

(56) References Cited

U.S. PATENT DOCUMENTS

| | | | | |
|---|---|---|---|---|
| 2010/0211933 | A1* | 8/2010 | Kiel | G06F 11/3636 717/125 |
| 2011/0023019 | A1* | 1/2011 | Aniszczyk | G06F 9/445 717/128 |
| 2012/0204060 | A1* | 8/2012 | Swift | G06F 11/1435 714/15 |
| 2013/0036403 | A1* | 2/2013 | Geist | G06F 11/3636 717/125 |
| 2013/0318132 | A1* | 11/2013 | Basu | G06F 12/0276 707/816 |

OTHER PUBLICATIONS

Sartor, et al., "No Bit Left Behind: The Limits of Heap Data Compression", Retrieved at: <<http://dl.acm.org/citation.cfm?id=1375634.1375651>>, In Proceedings of 7th International Symposium on Memory Management, Jun. 7, 2008, 10 pages.

Ta-Shma, et al., "Virtual Machine Time Travel Using Continuous Data Protection and Checkpointing", Retrieved at: <<http://dl.acm.org/citation.cfm?id=1375634.1375651>>, In Proceedings of ACM SIGOPS Operating Systems Review, vol. 42, Issue 1, Jan. 2008, 8 pages.

"Undo", Retrieved on: Dec. 17, 2013, Retrieved at: <<http://undo-software.com/>>, 2 pages.

Visan, et al., "URDB: A Universal Reversible Debugger Based on Decomposing Debugging Histories", In Proceedings of 6th Workshop on Programming Languages and Operating Systems, Oct. 23, 2011, 5 pages.

Wilson, et al., "Demonic Memories for Process Histories", Retrieved at: <<http://dl.acm.org/citation.cfm?doid=73141.74848>>, In Proceedings of ACM SIGPLAN Conference on Programming language Design and Implementation, Jun. 21, 1989, 14 pages.

Zilles, Craig B., et al., "Benchmark Health Considered Harmful", Retrieved at: <<http://dl.acm.org/citation.cfm?id=503206>>, In Proceedings of ACM SIGARCH Computer Architecture News, vol. 29, Issue 3, Jun. 2001, 2 pages.

Blackburn, et al. "Immix: A Mark-Region Garbage Collector with Space Efficiency, Fast Collection, and Mutator Performance", Retrieved at: <<http://users.cecs.anu.edu.au/~steveb/pubs/papers/immix-pldi-2008.pdf>>, In PLDI, 2008, 11 pages.

"What is Chronon?", Retrieved on: Jun. 30, 2014, Retrieved at: <<http://chrononsystems.com/what-is-chronon/performance>>, 2 pages.

"Announcing Chronon 'DVR for Java'", Retrieved on: Jun. 30, 2014, Retrieved at: <<http://www.theserverside.com/discussions/thread.tss?thread_id=62697>>, 5 pages.

"Better Software Development with Replay Debugging", Retrieved on: Jun. 30, 2014, Retrieved at: <<http://www.replaydebugging.com/>>, 12 pages.

"UndoDB reversible debugging tool for Linux", Retrieved on Jun. 30, 2014, Retrieved at: <<http://undo-software.com/product/undodb-overview>>, 2 pages.

Xu, et al., "ReTrace: Collecting Execution Trace with Virtual Machine Deterministic Replay", Retrieved at: <<http://xhfamily.com/x/files/MoBS07_replay_itrace.pdf>>, In MoBS, 2007, 8 pages.

Khoo, et al., "Expositor: Scriptable Time-Travel Debugging with First-Class Traces", Retrieved at: <<http://www.cs.umd.edu/~jfoster/papers/icse13.pdf>>, In Proceedings of the International Conference on Software Engineering, May 18, 2013, 10 pages.

"Postmortem Debugging", Retrieved on: Dec. 19, 2013, Retrieved at: <<http://my.safaribooksonline.com/book/operating-systems-and-server-administration/microsoft-windows/9780735671348/2dot-debugging-for-fun-and-profit/ch04_html>>, 18 pages.

Rister, et al., "Integrated Debugging of Large Modular Robot Ensembles", Retrieved at: <<http://www.cs.cmu.edu/~claytronics/software/debugging-stuff/Integrated%20Debugging%20of%20Large%20Modular%20Robot%20Ensembles.pdf>>, In Proceedings of IEEE International Conference on Robotics and Automation, Apr. 10, 2007, 8 pages.

Burtsev, et al., "Time-Travel for Closed Distributed Systems", Retrieved at: <<http://www.cs.utah.edu/~shanth/tt-report.pdf>>, In Proceedings of Third Symposium on Networked Systems Design and Implementation, May 2006, 16 pages.

Ryu, et al., "Source-Level Debugging for Multiple Languages with Modest Programming Effort", Retrieved at: <<http://www.cs.tufts.edu/~nr/pubs/ldbint.pdf>>, In Proceedings of the 14th International Conference on Compiler Construction, Apr. 4, 2005, 21 pages.

Visan, et al., "Temporal Debugging: Automating Time Travel Debugging with URDB", Retrieved at: <<http://www.ccs.neu.edu/home/xindong/oopsla10.pdf>>, Mar. 26, 2010, 12 pages.

Deva, Prashant, "Time inside a Time Travelling Debugger", Retrieved at: <<http://java.dzone.com/articles/time-inside-time-travelling>>, May 30, 20111, 3 pages.

Giuffrida, et al., "Back to the Future: Fault-tolerant Live Update with Time-traveling State Transfer", Retrieved at: <<http://www.cs.vu.nl/~ast/publications/lisa-2013.pdf>>, In Proceedings of the 27th international conference on Large Installation System Administration, Nov. 3, 2013, 16 pages.

Liu, et al., "WiDS Checker: Combating Bugs in Distributed Systems", Retrieved at: <<http://research.microsoft.com/pubs/69424/widschecker_nsdi07_camera.pdf>>, In Proceedings of the 4th USENIX conference on Networked systems design & implementation, Apr. 11, 2007, 14 pages.

Bao, et al., "Towards a Reversible BPEL Debugger", Retrieved at: <<http://research.microsoft.com/pubs/69424/widschecker_nsdi07_camera.pdf>>, In Proceedings of IEEE International Conference on Web Services, Sep. 23, 2008, 2 pages.

Koju, et al., "An Efficient and Generic Reversible Debugger using the Virtual Machine based Approach", Retrieved at: <<https://www.usenix.org/legacy/events/vee05/full_papers/p79-koju.pdf>>, In Proceedings of 1st International Conference on Virtual Execution Environments, Jun. 11, 2005, 10 pages.

Thane, et al., "Replay Debugging of Real-Time Systems Using Time Machines", Retrieved at: <<http://ieeexplore.ieee.org/stamp/stamp.jsp?tp=&arnumber=1213515 >>, In Proceedings of International Parallel and Distributed Processing Symposium, Apr. 22, 2003, 8 pages.

Akgul, et al., "A Fast Assembly Level Reverse Execution Method via Dynamic Slicing", Retrieved at: <<http://lara.epfl.ch/w/_media/projects:icse04.pdf>>, In Proceedings of the 26th International Conference on Software Engineering, May 23, 2004, 10 pages.

Brook, et al., "Reversible Debugging", Retrieved at: <<http://communities.mentor.com/mgcx/servlet/JiveServlet/previewBody/3039-102-1-5997/>>, In White Paper of Mentor Graphics, Jul. 3, 2009, 11 pages.

"Common Language Runtime (CLR)", Retrieved at: <<http://msdn.microsoft.com/en-us/library/8bs2ecf4(v=vs.110).aspx>>, Feb. 2, 2012, 3 pages.

"Debug Your App by Recording Code Execution with IntelliTrace", Retrieved on: Dec. 20, 2013, Retrieved at: <<http://msdn.microsoft.com/en-us/library/dd264915.aspx>>, 5 pages.

Agrawal, et al., "Debugging with Dynamic Slicing and Backtracking", Retrieved at: <<http://web.eecs.umich.edu/~valeria/teaching/eecs578_F06_old/papers/agr93.pdf>>, In Journal Software Practice & Experience, vol. 23, Issue 6, Jun. 1993, 28 pages.

Agrawal, et al., "Dynamic Program Slicing", Retrieved at: <<http://dl.acm.org/citation.cfm?id=93576>>, In Proceedings of the ACM SIGPLAN Conference on Programming language Design and Implementation, Jun. 20, 1990, 11 pages.

Bhansali, et al., "Framework for Instruction-level Tracing and Analysis of Program Executions", Retrieved at: <<http://dl.acm.org/citation.cfm?id=93576>>, In Proceedings of the 2nd International Conference on Virtual Execution Environments, Jun. 14, 2006, 10 pages.

Blackburn, et al., "Myths and Realities: The Performance Impact of Garbage Collection", Retrieved at: <<http://dl.acm.org/citation.cfm?id=1005693>>, In Proceedings of the Joint International Conference on Measurement and Modeling of Computer Systems, Jun. 12, 2004, 12 pages.

(56) References Cited

OTHER PUBLICATIONS

Blackburn, et al., "Barriers: Friend or Foe?", Retrieved at: <<http://dl.acm.org/citation.cfm?id=1029891>>, In Proceedings of 4th International Symposium on Memory Management, Oct. 24, 2004, 9 pages.

Bond, et al., "OCTET: Capturing and Controlling Cross-Thread Dependences Efficiently", Retrieved at: <<http://dl.acm.org/citation.cfm?id=2509519>>, In Proceedings of ACM SIGPLAN International Conference on Object Oriented Programming Systems Languages & Applications, Oct. 29, 2013, 20 pages.

Boothe, Bob, "Efficient Algorithms for Bidirectional Debugging", Retrieved at: <<http://dl.acm.org/citation.cfm?id=349339>>, In Proceedings of ACM SIGPLAN Conference on Programming Language Design and Implementation, Jun. 18, 2000, 12 pages.

Burg, et al., "Interactive Record/Replay for Web Application Debugging", Retrieved at: <<http://dl.acm.org/citation.cfm?id=2502050>>, In Proceedings of 26th Annual ACM Symposium on User Interface Software and Technology, Oct. 8, 2013, 11 pages.

Caballero, et al., "Undangle: Early Detection of Dangling Pointers in Use-After-Free and Double-Free Vulnerabilities", Retrieved at: <<http://dl.acm.org/citation.cfm?id=2336769>>, In Proceedings of International Symposium on Software Testing and Analysis, Jul. 15, 2012, 11 pages.

"Common Compiler Infrastructure", Retrieved on: Dec. 17, 2013, Retrieved at: <<http://ccimetadata.codeplex.com/>>, 1 page.

"Chronon", Retrieved on: Dec. 17, 2013, Retrieved at: <<http://chrononsystems.com/>>, 1 page.

Clark, et al., "Live Migration of Virtual Machines", Retrieved at: <<http://dl.acm.org/citation.cfm?id=1251203.1251223>>, In Proceedings of 2nd Conference on Symposium on Networked Systems Design & Implementation, vol. 2, May 2, 2005, 14 pages.

Driscoll, et al., "Making Data Structures Persistent", Retrieved at: <<http://www.cs.cmu.edu/~sleator/papers/making-data-structures-persistent.pdf>>, In Journal of Computer and System Sciences, vol. 38, No. 1, Feb. 1989, 39 pages.

Feldman, et al., "IGOR: A System for Program Debugging via Reversible Execution", Retrieved at: <<http://dl.acm.org/citation.cfm?id=69226>>, In Proceedings of ACM SIGPLAN and SIGOPS Workshop on Parallel and Distributed Debugging, May 5, 1988, 12 pages.

"GDB: The GNU Project Debugger", Retrieved on: Dec. 17, 2013, Retrieved at: <<http://www.gnu.org/software/gdb/news/reversible.html>>, 2 pages.

Goldsmith, et al., "Relational Queries over Program Traces", Retrieved at: <<http://dl.acm.org/citation.cfm?id=1094841>>, In Proceedings of 20th Annual ACM SIGPLAN Conference on Object-Oriented Programming, Systems, Languages, and Applications, Oct. 16, 2005, 18 pages.

Gu, et al., "Reusing Debugging Knowledge via Trace-based Bug Search", Retrieved at: <<http://dl.acm.org/citation.cfm?id=2384684>>, In Proceedings of ACM International Conference on Object Oriented Programming Systems Languages and Applications, Oct. 19, 2012, 16 pages.

Head, et al., "Debugging through Time with the Tralfamadore Debugger", Retrieved at: <<http://www.dcs.gla.ac.uk/conferences/resolve12/papers/session4_paper1.pdf>>, In Proceedings of Runtime Environments, Systems, Layering and Virtualized Environments, Mar. 3, 2012, 8 pages.

Holzle, et al., "Debugging Optimized Code with Dynamic Deoptimization", Retrieved at: <<http://dl.acm.org/citation.cfm?id=143114>>, In Proceedings of ACM SIGPLAN Conference on Programming Language Design and Implementation, Jun. 17, 1992, 12 pages.

Hunt, et al., "Singularity: Rethinking the Software Stack", Retrieved at: <<http://dl.acm.org/citation.cfm?id=1243424>>, In ACM SIGOPS Operating Systems Review—Systems work at Microsoft Research, vol. 41, Issue 2, Apr. 2007, 13 pages.

"Debug Your App by Recording Code Execution with IntelliTrace", Retrieved on: Dec. 17, 2013, Retrieved at: <<http://msdn.microsoft.com/en-us/library/vstudio/dd264915.aspx>>, 7 pages.

Jiang, et al., "Context-Aware Statistical Debugging: From Bug Predictors to Faulty Control Flow Paths", Retrieved at: <<http://dl.acm.org/citation.cfm?id=1243424>>, In Proceedings of 22nd IEEE/ACM International Conference on Automated Software Engineering, Nov. 5, 2007, 10 pages.

King, et al., "Debugging Operating Systems with Time-Traveling Virtual Machines", Retrieved at: <<https://www.usenix.org/legacy/event/usenix05/tech/general/king/king.pdf>>, In Proceedings of Annual Conference on USENIX Annual Technical Conference, Apr. 10, 2005, 15 pages.

Ko, et al., "Debugging Reinvented: Asking and Answering Why and Why Not Questions about Program Behavior", Retrieved at: <<http://dl.acm.org/citation.cfm?id=1368130>>, In Proceedings of 30th International Conference on Software Engineering, May 10, 2008, 10 pages.

Lee, et al., "Debug All Your Code: Portable Mixed-Environment Debugging", Retrieved at: <<http://dl.acm.org/citation.cfm?id=1640105>>, In Proceedings of 24th ACM SIGPLAN Conference on Object Oriented Programming Systems Languages and Applications, Oct. 25, 2009, 19 pages.

Lewis, Bil, "Debugging Backwards in Time", Retrieved at: <<http://pdf.aminer.org/000/819/352/debugging_backwards_in_time.pdf>>, In Proceedings of 5th International Workshop on Automated and Algorithmic Debugging, Oct. 9, 2003, 11 pages.

Lienhard, et al., "Practical Object-Oriented Back-in-Time Debugging", Retrieved at: <<http://scg.unibe.ch/archive/papers/Lien08bBackInTimeDebugging.pdf>>, In Proceedings of 22nd European conference on Object-Oriented Programming, Jul. 7, 2008, 25 pages.

Lo, et al., "Imagen: Runtime Migration of Browser Sessions for JavaScript Web Applications", Retrieved at: <<http://dl.acm.org/citation.cfm?id=2488459>>, In Proceedings of 22nd International Conference on World Wide Web, May 13, 2013, 11 pages.

Mickens, et al., "Mugshot: Deterministic Capture and Replay for JavaScript Applications", Retrieved at: <<https://www.usenix.org/legacy/events/nsdi10/tech/full_papers/mickens-mugshot.pdf>>, In Proceedings of 7th USENIX Symposium on Networked Systems Design and Implementation, Apr. 28, 2010, 15 pages.

Nielsen, Jakob, "Usability Engineering", Retrieved on: Dec. 17, 2013, Retrieved at: <<https://faculty.washington.edu/wobbrock/teaching/info470/Nielsen-93.pdf>>, 23 pages.

Plank, et al., "Libckpt: Transparent Checkpointing under Unix", Retrieved at: <<http://www.cs.ucla.edu/classes/fall02/cs239/11/papers/libckpt.pdf>>, In Proceedings of the USENIX Technical Conference Proceedings, Jan. 16, 1995, 13 pages.

Pluquet, et al., "Executing Code in the Past: Efficient In-Memory Object Graph Versioning", Retrieved at: <<http://dl.acm.org/citation.cfm?id=1640118>>, In Proceedings of 24th ACM SIGPLAN Conference on Object Oriented Programming Systems Languages and Applications, Oct. 25, 2009, 17 pages.

Porter, et al., "Rethinking the Library OS from the Top Down", Retrieved at: <<http://research.microsoft.com/pubs/141071/asplos2011-drawbridge.pdf>>, In Proceedings of 16th International Conference on Architectural Support for Programming Languages and Operating Systems, Mar. 5, 2011, 14 pages.

Pothier, et al., "Scalable Omniscient Debugging", Retrieved at: <<http://dl.acm.org/citation.cfm?id=1297067>>, In Proceedings of 22nd Annual ACM SIGPLAN Conference on Object-Oriented Programming Systems and Applications, Oct. 21, 2007, 17 pages.

\* cited by examiner

US 9,875,173 B2

TIME TRAVEL DEBUGGING IN MANAGED RUNTIME

BACKGROUND

Developers commonly spend a significant amount of time debugging programs. Developers often apply the scientific method when debugging a program: they observe a program's behavior on different inputs, first to reproduce a bug, then to localize the bug in the program's source. Reproducing, localizing, then fixing a bug typically involve forming and validating hypotheses about a root cause of the bug. The root cause of the bug is a first point at which a state of the program diverges from an intended state. To validate a hypothesis, a developer often halts program execution and examines the state of the program. Especially early in debugging, when the developer's quarry is still elusive, execution is commonly halted too soon or too late to validate a hypothesis. Overshooting (e.g., late halting of the execution of the program) can be expensive because returning to an earlier point in an execution of a program commonly involves restarting and re-running the program.

Integrated development environments (IDEs) commonly provide various tools for developing a program. Many conventional IDEs include a source code editor, build automation tools, and a debugger. The debugger can be used to halt program execution and examine the state of the program (e.g., via a graphical user interface (GUI) provided by the IDE). However, tool support for debugging has remained relatively unchanged for many years. Accordingly, the cost of restarting and re-running the program when a breakpoint is placed too late in the execution of the program remains.

SUMMARY

Described herein are various technologies that pertain to time travel debugging in a managed runtime system. The managed runtime system can include an execution component that executes a managed program component. Moreover, the managed runtime system can include a time travel debugger component. The time travel debugger component can be configured to record a sequence of live-object snapshots of program states during execution of the managed program component. A live-object snapshot can include live objects from a heap in memory at a given time during the execution. Moreover, the time travel debugger component can be configured to replay at least a portion of the execution of the managed program component based upon the live-object snapshots.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
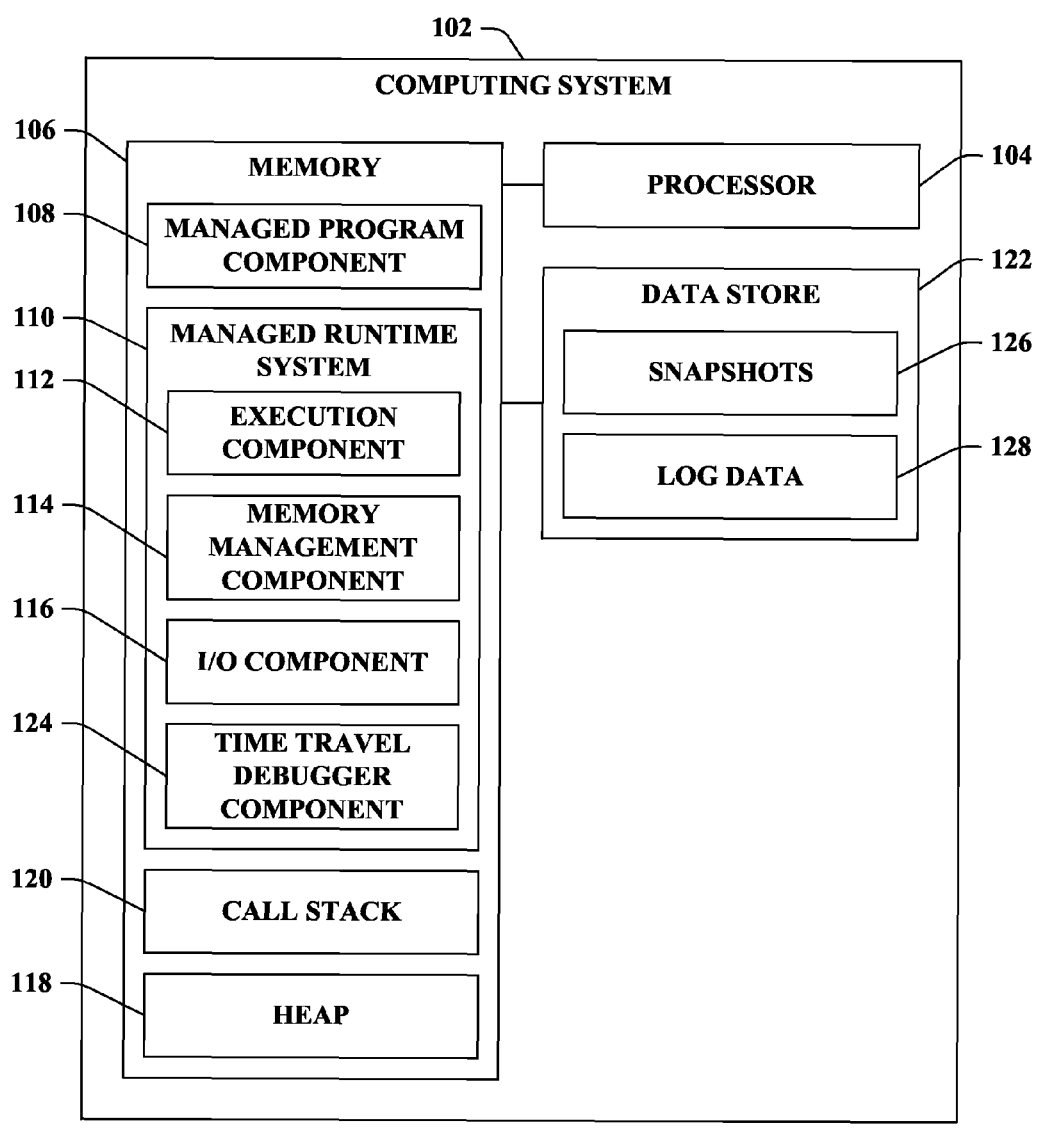
FIG. 1 illustrates a functional block diagram of an exemplary computing system that performs time travel debugging.

Various technologies pertaining to performing time travel debugging in managed runtime systems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a computing system 102 that performs time travel debugging. The computing system 102 includes a processor 104 and a memory 106. The processor 104 is configured to execute instructions loaded into the memory 106 (e.g., system(s) and/or component(s) loaded into the memory 106 are executable by the processor 104). As described in greater detail herein, the memory 106 includes instructions configured to perform record-replay time travel debugging.

According to various examples, the computing system 102 can be or include a computing device. Pursuant to various illustrations, the computing device can be a desktop computing device, a mobile computing device (e.g., a laptop computing device, a mobile telephone, a tablet computing device, a wearable computing device, a handheld computing device, a portable gaming device, a personal digital assistant (PDA), etc.), a gaming console, a set-top box, an in-vehicle communications and infotainment system, or the like. In accordance with other examples, the computing system 102 can be or include one or more server computing devices. For instance, the computing system 102 can be or include one or more datacenters, where a datacenter includes a plurality of server computing devices. Additionally or alternatively, the computing system 102 can be a distributed computing system.

The memory 106 of the computing system 106 includes a managed program component 108 and a managed runtime system 110. The managed program component 108 includes a sequence of instructions that are executable under control of the managed runtime system 110. The managed runtime system 110 can compile and/or interpret the managed program component 108 for the processor 104 and perform the instructions included in the managed program component 108.

The managed runtime system 110 can be a process virtual machine that runs as an application inside a host operating system and supports a process. The managed runtime system 110 can provide a platform-independent programming environment that abstracts details of the underlying hardware or operating system, and enables the managed program component 108 to be executed on differing platforms. The managed runtime system 110 provides features such as type safety, memory management, and virtual input/output (I/O).

According to an example, the managed program component 108 can include bytecode, which can be executed by the managed runtime system 110. By way of another example, the managed program component 108 can include a script written in a scripting language; following this example, the script can be interpreted and executed by the managed runtime system 110. Pursuant to yet another example, the managed program component 108 can include a sequence of intermediate language instructions; at runtime, the managed runtime system 110 can compile and execute the sequence of intermediate language instructions.

The managed runtime system 110 includes an execution component 112, a memory management component 114, and an I/O component 116. The execution component 112 can receive the managed program component 108. Moreover, the execution component 112 can execute the managed program component 108.

According to an example, the execution component 112 can be or include an interpreter. According to an exemplary scenario, the interpreter can directly perform the instructions of the managed program component 108. In accordance with another exemplary scenario, the interpreter can translate the instructions of the managed program component 108 to an intermediate representation and can execute the intermediate representation. According to yet another exemplary scenario, the instructions of the managed program component 108 can include precompiled code, and the interpreter can execute such precompiled code (e.g., the precompiled code can be machine independent code). Moreover, it is contemplated that a combination of the foregoing exemplary scenarios can be implemented by the interpreter. Further, pursuant to an illustration, it is contemplated that the interpreter can be a bytecode interpreter; yet, other types of interpreters are intended to fall within the scope of the hereto appended claims.

By way of another example, the execution component 112 can additionally or alternatively be or include a just-in-time (JIT) compiler. The JIT compiler can convert intermediate language instructions of the managed program component 108 to machine instructions for execution by the processor 104. Further, the JIT compiler can execute the machine instructions.

The memory management component 114 manages allocation and release of memory (e.g., portion of the memory 106) for the managed program component 108 during execution by the execution component 112. The memory management component 114 can be or include an allocator. Additionally or alternatively, the memory management component 114 can be or include a garbage collector. It is contemplated that various types of garbage collectors are intended to fall within the scope of the hereto appended claims (e.g., generational garbage collector, copying garbage collector, compacting garbage collector, etc.).

Upon initialization (e.g., of the managed program component 108 by the execution component 112), the memory management component 114 can reserve memory for the managed program component 108. The memory management component 114, for example, can reserve a contiguous region of address space in the memory 106 for the managed program component 108. The reserved address space can be referred to as a heap 118. Moreover, when the managed program component 108 creates an object, the memory management component 114 can allocate a portion of the memory 106 in the heap 118 for the object (e.g., if there is free memory in the heap 118). Further, the memory management component 114 can perform a collection (e.g., garbage collection) to release portion(s) of the memory 106 for dead object(s) in the heap 118 that are no longer being used by the managed program component 108.

Further, the memory 106 includes a call stack 120 (cs). The call stack 120 maintains an execution state of the managed program component 108 and includes call-frames. Each call-frame (cf) can be a tuple that can include a current procedure, a current program counter (pc) offset, a local variable-to-value map (vars), and a current evaluation stack (eval), for example. It is further contemplated that various other approaches of representing the execution state of the managed program component 108 are intended to fall within the scope of the claims (e.g., use of a register based runtime in place of an eval stack, a continuation passing style runtime which does not use a call stack, etc.).

The I/O component 116 can provide I/O virtualization. The I/O component 116 of the managed runtime system 110 can be utilized (e.g., during execution of the managed program component 108) to access the processor 104, a data store 122 of the computing system 102, peripherals of the computing system 102, or other data sources or data sinks (e.g., associated with the computing system 102, a disparate computing system, etc.) external to the managed runtime system 110.

Further, the managed runtime system 110 includes a time travel debugger component 124. The time travel debugger component 124 can enable testing and debugging the managed program component 108. The time travel debugger component 124 supports forward and reverse debugging of the managed program component 108. The time travel debugger component 124 can record the execution of the managed program component 108 (e.g., when the managed program component 108 is executed by the execution component 112). Further, the time travel debugger component 124 can replay the execution of the managed program component 108 by stepping the execution of the managed program component 108 both forwards and backwards in time.

By being within the managed runtime system 110, the time travel debugger component 124 can utilize features provided by the managed runtime system 110 (e.g., features provided by the execution component 112, the memory management component 114, the I/O component 116, etc.) to record and replay the execution of the managed program component 108. Examples of the features provided by the managed runtime system 110 (or component(s) thereof) that can be employed by the time travel debugger component 124 include type safety, memory management, and virtual I/O; yet, it is to be appreciated that other features can likewise be utilized by the time travel debugger component 124.

During forward execution of the managed program component 108 (e.g., performed by the execution component 112), the time travel debugger component 124 can record a sequence of snapshots 126 of program states of the managed program component 108 at various times. The managed program component 108, during execution, stores data in variables, which represent storage locations in the memory 106 (e.g., the call stack 120, the heap 118, etc.). At a given point during the execution of the managed program component 108, content of the storage locations in the memory 106 can be referred to as a program state of the managed program component 108 at the given point.

The snapshots 126 can be retained in the data store 122 of the computing system 102. For example, the time travel debugger component 124 can write a snapshot of the program state to a buffer; following this example, the snapshot can thereafter be saved to the data store 122 (e.g., via the I/O component 116). According to another example, the time travel debugger component 124 can directly write a snapshot of the program state to a file retained in the data store 122.

According to an example, the snapshots 126 in the sequence can be periodically recorded by the time travel debugger component 126 at a predefined time interval (e.g., a predefined snapshot interval). Pursuant to another example, a time interval at which the snapshots 126 are sequentially recorded by the time travel debugger component 126 can be dynamically adjusted; following this example, the time interval can be dynamically adjusted during the execution of the managed program component 108.

A snapshot captured by the time travel debugger component 124 can include live objects from the heap 118, while dead objects in the heap 118 can be omitted from the snapshot (e.g., the snapshots 126 can be live-object snapshots). Examples of objects in the heap 118 include records, arrays, and so forth. Pursuant to an exemplary scenario, the dead objects in the heap 118 can be omitted by performing a copying traversal of the live objects from the heap 118. In accordance with another exemplary scenario, the dead objects in the heap 118 can be omitted by coordinating garbage collection performed by the memory management component 114 and capture of the snapshot by the time travel debugger component 124 (e.g., the capture of the snapshot can piggyback on the garbage collection).

It is contemplated, however, that some dead objects may be captured as part of a live-object snapshot. For example, a mark-region garbage collector can organize the heap 118 into regions; the mark-region collector can allocate objects from the regions. With the mark-region collector, the regions can generally be kept dense with live objects. Accordingly, a snapshot captured by copying complete regions (e.g., with capture coordinated with such garbage collection) can include a number of dead objects. However, use of a mark-region collector can be more efficient than copying each object individually. It is also contemplated, in accordance with another exemplary scenario, that dead objects in the heap 118 can be lazily evacuated (e.g., using hardware page protection).

According to another example, rather than the snapshots 126 being live-object snapshots, it is contemplated that the snapshots 126 captured by the time travel debugger component 124 can be page-level snapshots. Thus, a snapshot captured by the time travel debugger component 124 can include a page from the heap 118.

Moreover, the time travel debugger component 124 traces environmental interactions (e.g., identified from the I/O component 116); the environmental interactions can be stored as part of log data 128. The log data 128, for example, can be retained in the data store 122. The environmental interactions can be traced during periods of time between the snapshots 126. Examples of the environmental interactions that can be traced include file I/O, console I/O, GUI I/O, network I/O, or the like. Yet, it is contemplated that the time travel debugger component 124 need not trace all of the foregoing exemplary types of environmental interactions and/or other types of environmental interactions can be traced by the time travel debugger component 124.

The time travel debugger component 124 can replay the execution of the managed program component 108 using the snapshots 126. The time travel debugger component 124 can further replay the execution of the managed program component 108 using the log data 128. As noted above, the time travel debugger component 124 can replay the execution of the managed program component 108 forwards and backwards in time.

By supporting forward and reverse execution during replay, the time travel debugger component 124 can speed a hypothesis formation and validation loop carried out when debugging the managed program component 108 by allowing a developer to navigate backwards as well as forwards in the execution history of the managed program component 108. Moreover, other debugging tools, such as interrogative debugging, automated fault localization, automatic fault-recovery and reporting, or automatic root cause analysis, can use output from the time travel debugger component 124; the ability to perform efficient forward and reverse execution during replay can enable such other debugging tools.

Figure 2:
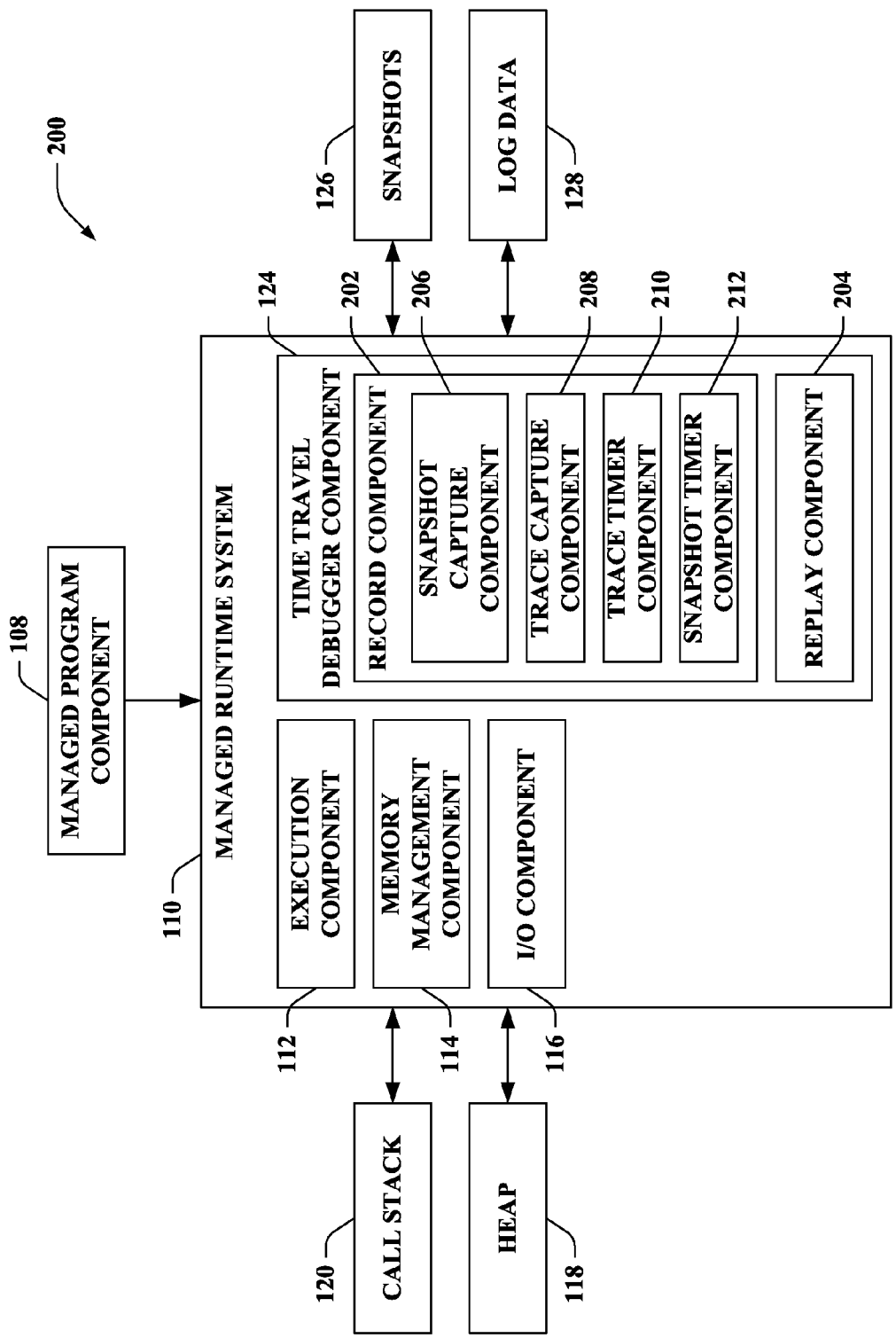
FIG. 2 illustrates a functional block diagram of an exemplary system that performs time travel debugging of managed program component as part of a managed runtime system.

Turning to FIG. 2, illustrated is a system 200 that performs time travel debugging of the managed program component 108 as part of the managed runtime system 110. Again, the managed runtime system 110 includes the execution component 112, the memory management component 114, the I/O component 116, and the time travel debugger component 124.

The time travel debugger component 124 can be a record-replay time-traveling debugger. More particularly, the time travel debugger component 124 can include a record component 202 and a replay component 204. The record component 202, during forward execution of the managed program component 108 by the execution component 112, records the snapshots 126 of the program states sequentially at intervals of time. Further, the record component 202 records the log data 128 from the trace of the external interactions.

The replay component 204 can replay the execution of the managed program component 108; the replay component 204 can replay the execution both forwards and backwards in time. To enable such time-travel during replay of the execution of the managed program component 108, the replay component 204 restores a selected snapshot from the snapshots 126 that precedes a time-travel target time. According to an example, the replay component 204 can identify a snapshot from the snapshots 126 that is nearest in time and precedes the time-travel target time as the selected snapshot; yet, it is to be appreciated that the replay component 204 can alternatively identify a differing snapshot from the snapshots 126 that precedes the time-travel target time as the selected snapshot (e.g., Nth nearest in time, where N can be substantially any integer greater than 1). Moreover, the replay component 204 re-executes forward in time from the selected snapshot, replaying external interactions from the log data 128, until reaching the time-travel target time.

The record component 202 can further include a snapshot capture component 206, a trace capture component 208, a trace timer component 210, and a snapshot timer component 212. The snapshot capture component 206 captures the snapshots 126 of the program states of the managed program component 108 during execution by the execution component 112. Moreover, the trace capture component 208 records the log data 128 from the trace of the external interactions during execution of the managed program component 108 by the execution component 112. The trace capture component 208 can leverage external interaction handling provided by the managed runtime system 110 (e.g., the I/O component 116) to enable recording the log data 128. Use of the managed runtime system 110, for instance, can make efficient interaction handling feasible by restricting a space of external interactions to a manageable number of application programming interfaces (APIs).

The trace timer component 210 provides a trace time (TraceTime) that can be incremented. TraceTime can be used to control an order of logged events (e.g., in the log data 128) and the snapshots 126 respectively recorded by the trace capture component 208 and the snapshot capture component 206 during execution of the managed program component 108 (e.g., to enable execution replay by the replay component 204 to be deterministic). Further, each execution of a statement can be assigned a respective TraceTime timestamp. Accordingly, the replay component 204 can use TraceTime to determine an appropriate execution, of possibly many executions, of a given statement on which to break.

The snapshot timer component 212 provides a snapshot timer (SnapTimer) used to control a snapshot interval. Accordingly, the snapshot capture component 206 can capture a snapshot if SnapTimer is expired. When the snapshot capture component 206 captures a snapshot, the snapshot timer component 212 resets SnapTimer.

Below is an exemplary procedural language. Many of the exemplary algorithms provided herein are defined in the context of this procedural language. It is to be appreciated that the procedural language and the exemplary algorithms set forth herein are provided to illustrate various exemplary implementations; yet, other implementations are intended to fall within the scope of the hereto appended claims.

| Global Vars | g, ... |
|---|---|
| Local Vars | v, ... |
| Fields | f, ... |
| Records | ::= struct: $\{f_1 : \tau_1, ..., f_k : \tau_k\}$, ... |
| Type τ | ::= bool \| int \| float \| struct *\| τ[ ] |
| Constant c | ::= $i \in \mathbb{Z}$ \| $r \in \mathbb{R}$ \| true \| false |
| Procedure Proc | ::= Proc($arg_1$, ... $arg_k$) $block_1$ ... $block_j$ |
| Block block | ::= $stmt_1$ ... $stmt_k$ |
| Statement stmt | ::= load \| store \| exp \| cjmp $block_t$, $block_f$ \| ret v \| call Proc \| new struct \| new τ[ ] |
| Load load | ::= push c \| load v \| load f \| ... |
| Store store | ::= store v \| store f \| ... |
| Expression exp | ::= nop \| add \| and \| pop \| ... |

The above procedural language has a type system with standard primitive types, along with pointer-referenced heap allocated record and array types. A stack-based execution model supports a set of operators. The managed program component 108 can include a set of record type definitions and procedures. A procedure can either be user-defined or a built-in operation that provides access to resources virtualized by the managed runtime system 110.

The following pseudocode shows an exemplary forward execution algorithm (Algorithm 1) that can be performed by the execution component 112 and the record component 202 (e.g., to capture the snapshots 126 of the program states and the log data 128). It is contemplated that the underlined portions of the pseudocode can enable subsequent replay to be performed (e.g., by the replay component 204). Disparate cases during forward execution that are unaltered for time travel debugging are omitted in the following pseudocode.

Algorithm 1: ExecuteForward

```
Input: Program p
 1  Initialize(globals,allocator,iosystem(TTD));
 2  cs ← newStack( );
 3  locals ← InitLocals(main,∅);
 4  cs.Push((main,&main.block₁ [0], locals, ∅));
 5  TraceTime ← 0;
 6  SnapTimer ← newTimer(SNP_INTERVAL);
 7  while cs ≠ ∅ do
 8      cf ← cs.Top( );
 9      switch cf.StmtAtPC( ) do
10          case cjmp blockₜ, block_f
11              block ← cf.eval.Pop( )?blockₜ:block_f;
12              cf.pc ← &block[0];
13              if IsLoopHeader(block) then
14                  TraceTime + +;
15                  if SnapTimer.Expired then DoSnapShot( );
16          case call Proc
17              TraceTime + +;
18              if Proc is BuiltIn then
19                  ExecuteBuiltin(Proc,cf,globals);
20              else
21                  locals ← InitLocals(Proc,cf.eval);
22                  cs.Push(Proc,&Proc.block₁[0],locals,∅));
23                  if SnapTimer.Expired then DoSnapShot( );
24              cf.pc + +;
25          case new τ
26              DoGC( );
27              TraceTime + +;
28              if SnapTimer.Expired then DoSnapShot( );
29              if τ is struct then
30                  cf.eval.Push(AllocStruct(τ));
31              else
32                  len ← cf.eval.Pop( );
33                  cf.eval.Push(AllocArray(len));
34              cf.pc + +;
35          ...
```

In the foregoing algorithm, the execution loop switches on the current statement to dispatch code implementing the operation. Again, it is noted that underlined portions of the pseudocode in Algorithm 1 can enable the replay component 204 to replay the execution of the managed program component 108. The underlined portions are now described in greater detail.

At line 1, data structures used for persistent I/O libraries and logging are initialized. At line 5, TraceTime is initialized. As noted above, TraceTime can be used to provide an order of logged events and snapshots during execution of a program p (e.g., the managed program component 108). At line 6, SnapTimer is initialized and started to control a snapshot interval (SNP_INTERVAL) (e.g., time interval at which the snapshots are sequentially recorded).

DoSnapShot( ) (e.g., performed by the snapshot capture component 206) captures a snapshot of a program state for use during time-travel and then resets SnapTimer. Lines 15, 23, and 28 include checks to identify whether SnapTimer has expired (e.g., compare SnapTimer to the snapshot interval); if SnapTimer has expired, then DoSnapShot( ) is called to capture a snapshot (e.g., the snapshots 126 can include such snapshot). Inserting checks for expiration of SnapTimer at each loop head (line 15) and procedure call (line 23) bounds the time between the expiration of SnapTimer and a next call to DoSnapShot( ). Moreover, checks for expiration of SnapTimer are inserted at each allocation site (line 28). According to an example, snapshot captures can piggyback on garbage collection (e.g., performed by the memory management component 114, at line 26, etc.); however, the claimed subject matter is not so limited.

Further, TraceTime can be used to control the order of logged events and snapshots, and every execution of a statement can have a respective TraceTime timestamp. To control the order of logged events and snapshots, TraceTime is incremented when a built-in procedure, which can generate log data, may execute (line 17) or when a snapshot is taken. Moreover, to enable the replay component 204 to use TraceTime to determine an appropriate execution of a given statement on which to break during replay, TraceTime is incremented when a loop header (line 14) or a procedure call (line 17) is visited.

The below pseudocode depicts an exemplary replay execution algorithm (Algorithm 2) that can be performed by the replay component 202 (e.g., to replay the execution of the managed program component 108).

---

Algorithm 2: ExecuteReplay

Input: Program p, Target (targetpc, targettime)
1 snp ← FindNearestPreSnapShot(targettime);
2 Initialize(snp.globals, snp.allocator, snp.cs);
3 iosystem.ReverseExecuteIOLogTo(snp.TraceTime);
4 TraceTime ← snp.TraceTime;
5 InReplayMode ← true;
6 while targettime ≠ TraceTime ∧ targetpc ≠ cs.Top( ).pc do
7   cf ← cs.Top( );
8   if targettime − TraceTime < TRACE _RNG then TraceStmt( );
9   switch cf.StmtAtPC( ) do
10    ...
11 InReplayMode ← false;

---

At line 1, a snapshot (snp) (e.g., from the snapshots 126) that is nearest to and precedes a target trace time (targettime) is identified. At line 2, global variables, a memory allocator (and the heap 118), and the call stack 120 are reset from the snapshot. At line 3, an I/O system is reverted to the snapshot time (e.g., the I/O component 116 can be reverted to the snapshot time). After restoring the snapshot, an InReplayMode flag is set; library functions can check the InReplay-Mode flag to avoid re-executing non-idempotent operations (e.g., sending network packets, etc.) during replay.

The main execution loop of Algorithm 2 exits upon reaching the target trace time (targettime) and a target program counter (targetpc) (while statement of line 6). During replay, a full trace can be collected (e.g., by the trace capture component 208) to speed subsequent time-travel requests. To reduce a pause time after which reverse execution can be available (e.g., due to overhead associated with capturing the full trace), trace collection can be delayed to start until replay is close to the target trace time (line 8) (e.g., within a threshold range (TRACE_RNG)). Once at the time-travel target (e.g., targettime and targetpc), the algorithm resets the replay mode flag (line 11) and returns to the debugger interface.

Figure 3:
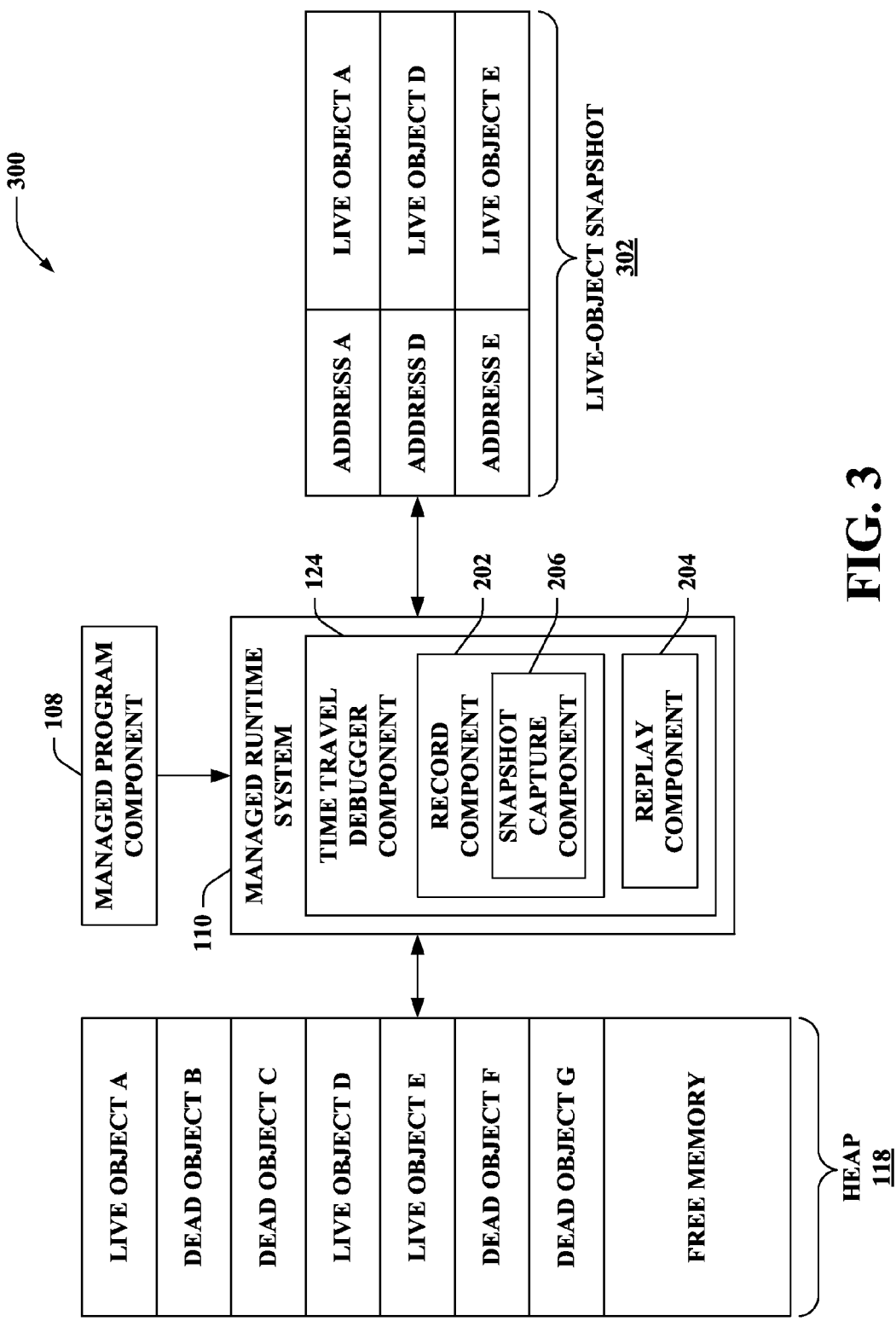
FIG. 3 illustrates a functional block diagram of an exemplary system that captures a live-object snapshot as part of record-replay time travel debugging.

Turning to FIG. 3, illustrated is a system 300 that captures a live-object snapshot 302 as part of record-replay time travel debugging. The system 300 includes the managed program component 108 and the managed runtime system 110. The managed runtime system 110 is depicted in FIG. 3 to include the time travel debugger component 124; yet, it is to be appreciated that the managed runtime system 110 can further include the execution component 112, the memory management component 114, and the I/O component 116. As described above, the time travel debugger component 124 can include the record component 202 and the replay component 204. Moreover, the record component 202 can include the snapshot capture component 206 that captures the live-object snapshot 302 (e.g., in a sequence of live-object snapshots, one of the snapshots 126) of a program state of the managed program component 108 during forward execution (e.g., by the execution component 112). Further, although not depicted, it is contemplated that the record component 202 can include the trace capture component 208 to capture the log data 128 from the trace of the external interactions handled by the managed runtime system 110.

According to the example set forth in FIG. 3, the snapshot capture component 206 records live objects from the heap 118 at a given time during the execution in the live-object snapshot 302. The snapshot capture component 206 can record both addresses and contents of the live objects as part of the live-object snapshot 302. Further, the snapshot capture component 206 can omit recording dead objects from the heap 118 in the live-object snapshot 302.

As depicted in the simplified example of FIG. 3, the heap 118 can include live objects A, D, and E as well as dead objects B, C, F, and G at a given time during execution of the managed program component 108. Moreover, the heap 118 can include free memory. The snapshot capture component 206 can record addresses and contents of the live objects A, D, and E from the heap 118 as part of the live-object snapshot 302. Moreover, in the example of FIG. 3, the live-object snapshot 302 generated by the snapshot capture component 206 lacks addresses and contents of the dead objects B, C, F, and G.

In accordance with an example, the snapshot capture component 206 can perform copying traversal of the live objects in the heap 118 at the given time during the execution of the managed program component 108 to record the live objects as part of the live-object snapshot 302. For instance, recording the live objects as part of the live-object snapshot 302 can include serializing the addresses and the contents of the live objects. According to another example, the memory management component 114 of the managed runtime 110 can perform garbage collection to compact the live objects in the heap 118 into a contiguous range; following this example, the snapshot capture component 206 can directly output the contiguous range that includes the live objects as part of the live-object snapshot 302 (e.g., without performing the copying traversal of the live objects in the heap 118).

Figure 4:
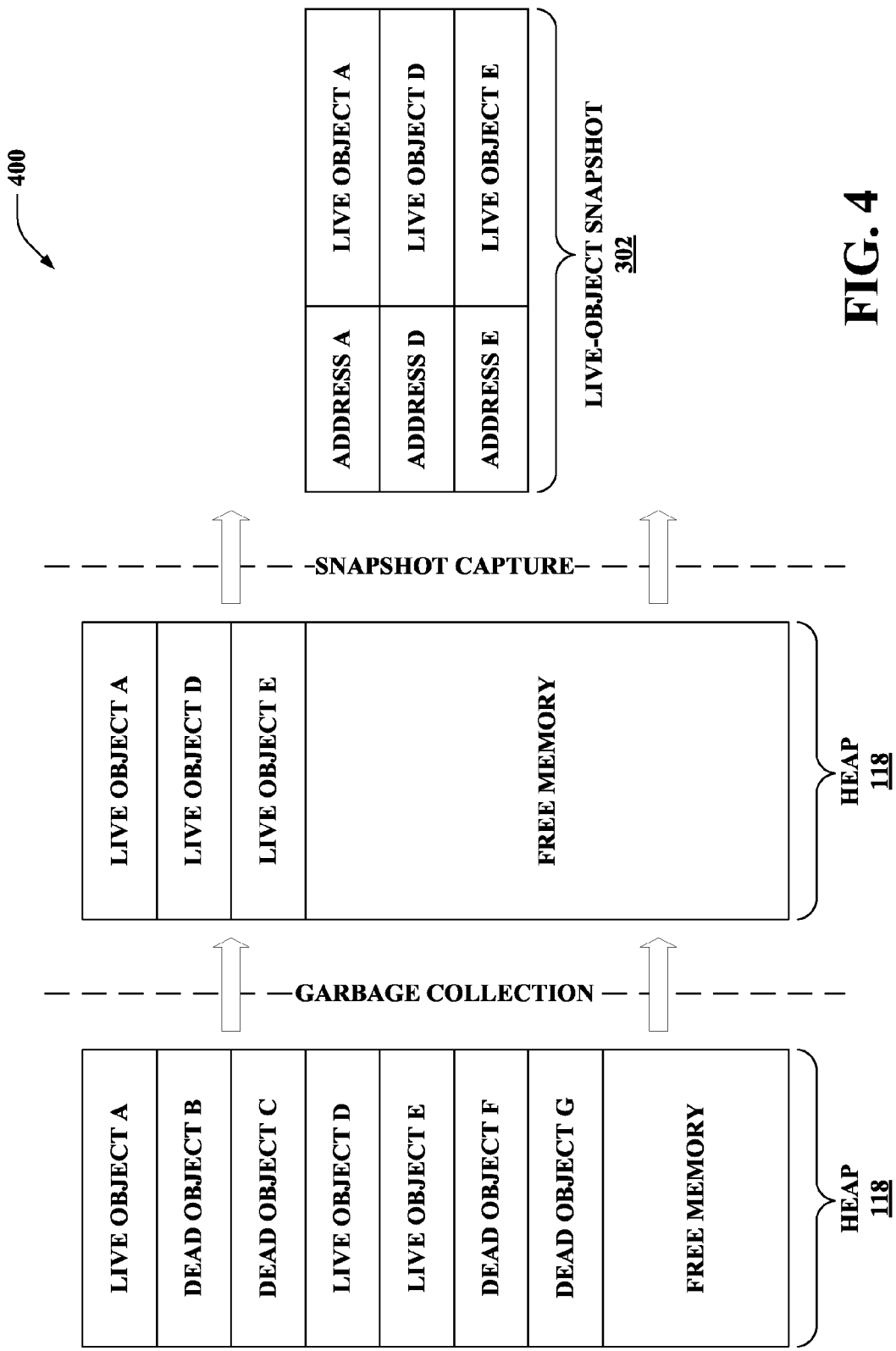
FIG. 4 illustrates a simplified example where garbage collection is performed on a heap to enable directly outputting live objects from the heap in a live-object snapshot.

FIG. 4 depicts a simplified example where garbage collection is performed on the heap 118 to enable directly outputting the live objects from the heap 118 in the live-object snapshot 302. Again, the heap 118 can include the live objects A, D, and E and the dead objects B, C, F, and G. A garbage collection can be performed to release portions of memory for dead objects in the heap 118, and the live objects can be compacted into a contiguous range of the heap 118. Thereafter, the live-object snapshot 302 can be recorded by directly outputting the contiguous range of the heap 118 that includes the live objects A, D, and E into the live-object snapshot 302. The contiguous range of the heap 118 that includes the live objects can be written to the live-object snapshot 302 without performing a copying traversal of the live objects in the heap 118, for instance (e.g., which can enhance efficiency and reduce an amount of time and cost of capturing a snapshot). While FIG. 4 shows the live-object snapshot 302 including the addresses of the live objects, according to other examples it is contemplated that the addresses of the live objects need not be included in the live-object snapshot 302 recorded by directly outputting the contiguous range of the heap 118.

Moreover, other types of garbage collection are intended to fall within the scope of the hereto appended claims. According to an example, a mark-region garbage collector can organize the heap 118 into regions; the mark-region collector can allocate objects from the regions. With the mark-region garbage collector, the regions can generally be kept dense with live objects, but may include a number of dead objects. Thus, a snapshot captured by copying regions can include a few dead objects. Yet, the claimed subject matter is not limited to the foregoing example.

Reference is again made to FIG. 3. Below is pseudocode of an exemplary snapshot capture algorithm (Algorithm 3) that can be performed by the snapshot capture component 206. Algorithm 3 includes a walk-copy loop (starting at line 4); thus, the snapshot capture component 206 can perform copying traversal of the live objects in the heap 118 to capture the live-object snapshot 302 that includes the live objects. Algorithm 3 is provided as an exemplary implementation of DoSnapShot( ) set forth above in Algorithm 1; however, it is to be appreciated that the claimed subject matter is not limited to this example, as other implementations are intended to fall within the scope of the hereto appended claims.

---

Algorithm 3: SnapshotCapture

---

Input: Buffer snapbuff
1 SerializeEnvironment(globals,cs,snapbuff);
2 SerializeAllocatorState(allocator,snapbuff);
3 worklist ← NonNullRootSet(globals,cs);
4 while worklist ≠ ∅ do
5   cptr ← worklist.Dequeue( );
6   type ← TypeResolve(cptr);
7   Mark(cptr);
8   SerializeAddr(cptr, snapbuff);
9   SerializeMemory(cptr,sizeof(type),snapbuff);
10   foreach childptr ∈ Pointers(cptr,type) do
11     if childptr ≠ null ∧ !IsMarked(childptr) then
12       worklist.Enqueue(childptr);

---

The exemplary implementation of DoSnapShot( ) set forth in Algorithm 3 can be designed to ease integration of the time travel debugger component 124 into an existing managed runtime system (e.g., the managed runtime system 110). For instance, the memory management component 114 (e.g., the allocator, the garbage collector, etc.) and a memory layout of records or objects need not be altered. Thus, this formulation can be retrofitted to existing managed runtime system(s) via changes to the execution component 112 (e.g., the interpreter/compiler) or via bytecode rewriting.

Given a buffer (or file) where the live-object snapshot 302 is to be written (snapbuff), Algorithm 3 begins by serializing global variables and the current call stack (e.g., the call stack 120) at line 1. The next step (line 2) serializes the heap and allocator state which, depending on the allocator, includes information indicative of maximum heap size, generation information, free list, etc. At line 3, a worklist is initialized with a set of non-null roots for the live heap.

As noted above, the main heap walk-copy loop, starting at line 4, is a copying traversal of the live objects in the heap 118. To process each pointer, a type of a referenced record or array is determined at line 6 and the pointer is marked as visited at line 7. Next, an address (line 8) and contents of the record/array itself (line 9) are serialized into the buffer. Once this finishes, the walk-copy loop iterates over the pointer fields in the record or array using the Pointers function and the type of memory (line 10). Each non-null and unvisited child pointer (childptr) is added to the worklist. When the processing loop terminates, the program state of the managed program component 108 has been serialized to enable re-instantiation and re-execution by the replay component 204 (e.g., via performance of Algorithm 2).

The foregoing snapshot computation presented in Algorithm 3 can rely on few assumptions about, and may be implemented with minimal modifications to, the data layouts and garbage collection algorithms (e.g., performed by the memory management component 114) in the managed runtime system 110. Accordingly, a process of extending existing managed runtime systems and/or debuggers to include time travel debugging functionality can be simplified using such techniques.

Figure 5:
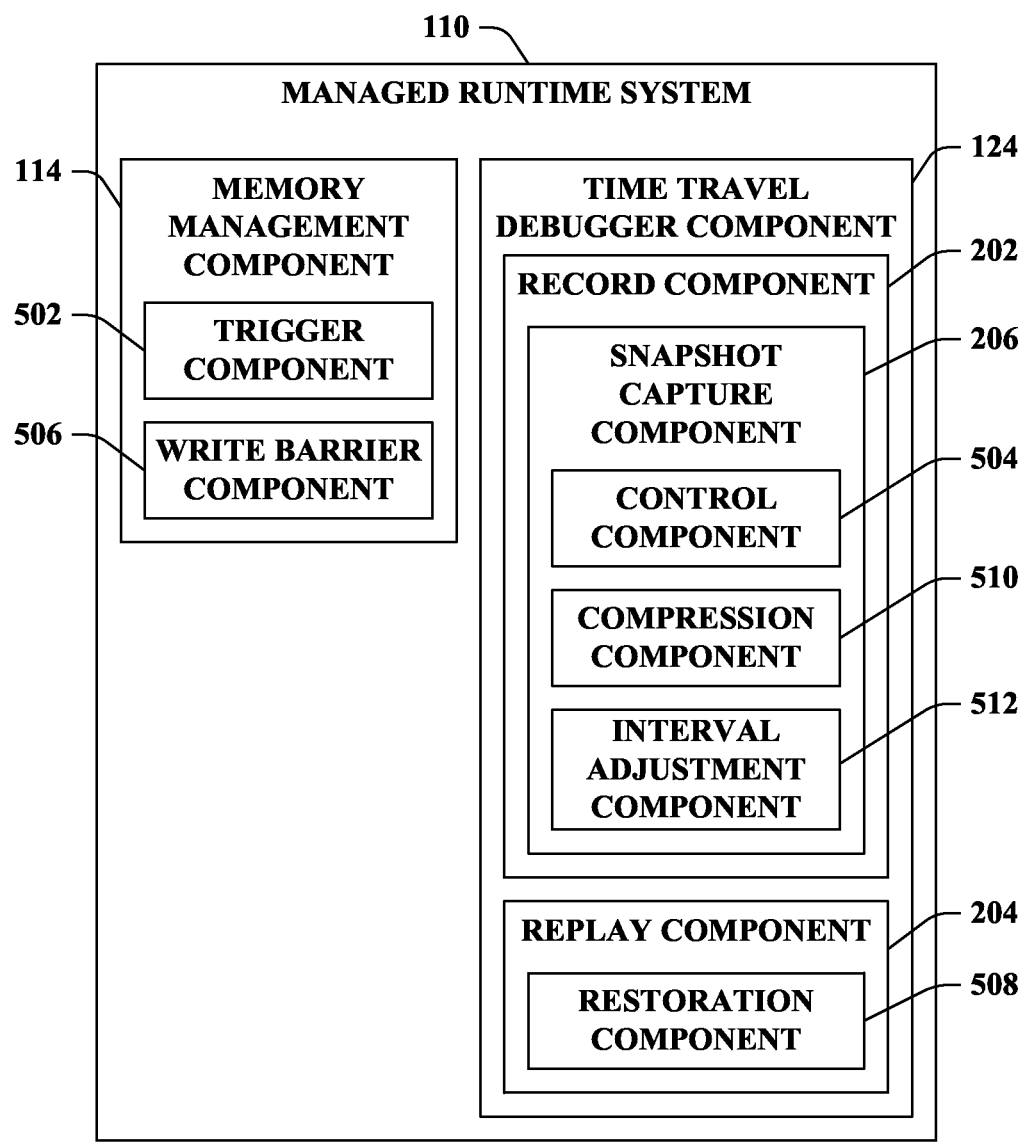
FIG. 5 illustrates a functional block diagram of an exemplary system that includes a time travel debugger component and a memory management component in accordance with various examples.

With reference to FIG. 5, illustrated are the time travel debugger component 124 and the memory management component 114 of the managed runtime system 110 in accordance with various examples. Although not shown, it is again contemplated that the managed runtime system 110 can include the execution component 112 and the I/O component 116. Moreover, it is to be appreciated that the record component 202 can include the trace capture component 208 to capture log data from a trace of the external interactions handled by the managed runtime system 110.

Below are various exemplary modifications of the memory management component 114 and/or the time travel debugger component 124. Moreover, it is contemplated that a combination of such exemplary modifications can be implemented in the managed runtime system 110. The exemplary modifications can leverage various features of the managed runtime system 110 to reduce overhead (e.g., reduce an amount of time to capture a snapshot, reduce an amount of data that is serialized, etc.) due to incorporation of time travel debugging within the managed runtime system 110.

Exemplary Modification 1: Opportunistic Garbage Collection Piggybacking.

In Exemplary Modification 1, the memory management component 114 can perform a garbage collection to release portions of the memory for dead objects in the heap 118 and compact the live objects into a contiguous range in the memory. The memory management component 114 can be or include a copying garbage collector or a compacting garbage collector. After copying or compacting garbage collection (e.g., the garbage collection call on line 26 of Algorithm 1), live objects in the heap 118 are compacted into a contiguous range in the heap 118 (e.g., as depicted in the example of FIG. 4).

Further, according to Exemplary Modification 1, performance of the garbage collection can be triggered based upon an amount of free memory in the heap 108 and a remaining amount of time until a next snapshot in the sequence of snapshots. The memory management component 114, according to Exemplary Modification 1, includes a trigger component 502 that triggers the memory management component 114 to perform the garbage collection.

The trigger component 502 can enable coordinating garbage collection with the snapshot capturing performed by the snapshot capture component 206. Thus, as opposed to triggering garbage collection when an amount of free memory in the heap 118 (FreeMem) reaches 0 (e.g., no space remains in the free memory), the trigger component 502 can trigger the memory management component 114 to perform garbage collection as follows:

$$\text{FreeMem}=0$$
$$\vee(\text{FreeMem}<\delta \char`\^ \text{SnapTimer-Remaining}<\epsilon)$$

The foregoing may trigger the memory management component 114 to run garbage collection before the heap 118 runs out of free memory (e.g., FreeMem reaches 0). More particularly, the trigger component 502 can trigger garbage collection when less than δ bytes remain in the free memory and a next snapshot is due to be captured in less than ε seconds. Further, the snapshot capture component 206 can directly output the contiguous range in the memory that includes the live objects as at least part of the snapshot.

Moreover, according to Exemplary Modification 1, the snapshot capture component 206 can include a control component 504. The control component 504 can selectively control whether copying traversal of live objects in the heap 118 is performed by the snapshot capture component 206. Thus, the control component 504 can manage whether the snapshot capture component 206 captures a snapshot of the live objects in the heap 118 by directly outputting the contiguous range that includes the live objects from the heap 118 (e.g., skipping the heap walk-copy loop in Algorithm 3 when DoSnapShot( ) is called on line 28 of Algorithm 1) or by performing the copying traversal of the live objects in the heap 118 (e.g., performing the heap-walk loop in Algorithm 3). For example, if the amount of free memory remaining in the heap 118 exceeds δ bytes, then the control component 504 can cause the snapshot capture component 206 to perform the copying traversal of the live objects in the heap 118.

Due to the trigger component 502 causing the early garbage collection, the snapshot capture component 206 can opportunistically piggyback a snapshot on the garbage collection, which can reduce a cost of capturing the snapshot. Moreover, the walk-copy loop in Algorithm 3 can compact the live objects in the heap 118 into a contiguous range to enable efficient storage; yet, such loop can be redundant if a snapshot is captured responsive to performance of garbage collection.

According to an example, in the managed runtime system 110 as described in Exemplary Modification 1, the time travel debugger component 124 can capture and replay execution using live-object snapshots. By way of another example, in the managed runtime system 110 as described in Exemplary Modification 1, the time travel debugger component 124 can capture and replay execution using page-level snapshots.

Exemplary Modification 2: Generational Optimization.

The memory management component 114, according to Exemplary Modification 2, can be or include a generational garbage collector. Thus, the memory management component 114 can divide the heap 118 into a nursery and an old space. In the managed runtime system 110 as described in Exemplary Modification 2, the time travel debugger component 124 captures and replays execution using live-object snapshots.

Pursuant to an illustration, a generational garbage collector can perform a sequence of phases that may include a mark phase, a sweep phase, a compaction phase, and a promotion phase. In a mark phase, the generational garbage collector marks objects in a youngest generation in the heap 118 (e.g., the nursery) that are still used by the managed program component 108. Next, in a sweep phase, the generational garbage collector reclaims the unmarked objects by placing the unused memory space into a free memory pool. In a compaction phase, the live objects are coalesced to the top or bottom of the heap 118 to mitigate fragmentation. Compaction can include moving one or more objects to a particular area of the heap 118 and updating references to each object to reflect the new memory location. The promotion phase advances the objects that survive a garbage collection to an older generation in the heap 118 (e.g., old space). For instance, promotion can be based upon a tenure policy. It is to be appreciated, however, that the claimed subject matter is not limited to the foregoing illustration.

Further, the memory management component 114 includes a write barrier component 506 in Exemplary Modification 2. The write barrier component 506 can be or include an object-based write barrier, for example. During execution of the managed program component 108 by the execution component 112, the write barrier component 506 can track older generation objects (e.g., objects in the old space) that are modified since a last live-object snapshot in the sequence. According to other examples, the write barrier component 506 can be or include card tables, memory spans, copy-on-write pages, or the like.

Further, the snapshot capture component 206 can capture a live-object snapshot at a given time during execution of the managed program component 108. The snapshot capture component 206, for instance, can include the control component 504 in Exemplary Modification 2. The control component 504 can cause the snapshot capture component 206 to perform copying traversal of the live objects in the nursery of the heap 118 at the given time during the execution to record the live objects in the nursery as part of the live-object snapshot (e.g., perform the walk-copy loop on the nursery during an explicit heap walk for the live-object snapshot). Further, the control component 504 can cause the snapshot capture component 206 to record, as part of the live-object snapshot, the objects in the old space of the heap 118 indicated as being modified since the last live-object snapshot in the sequence. The snapshot capture component 206, for instance, can record such objects in the old space by serializing such objects.

Only the objects identified by the write barrier component 506 as being modified since a last live-object snapshot are recorded by the snapshot capture component 206. Thus, rather than visiting and serializing long-lived objects multiple times (which is redundant and can increase the cost of the heap walk-copy loop and an amount of data written), such long-lived objects that are unmodified since the last live-object snapshot need not be serialized in a current snapshot.

The replay component 204 further include a restoration component 508 in the Exemplary Modification 2. As noted above, the replay component 204 restores a selected live-object snapshot (e.g., from the snapshots 126) that precedes a time-travel target time. The restoration component 508 identifies additional live-object snapshot(s) prior to the selected live-object snapshot to restore values for unchanged objects. According to an example, an old space portion of a live-object snapshot can be separated from a nursery portion of such live-object snapshot, and a map from old space objects to the live-object snapshot which holds their values can be used by the restoration component 508 to identify the additional live-object snapshots.

Figure 6:
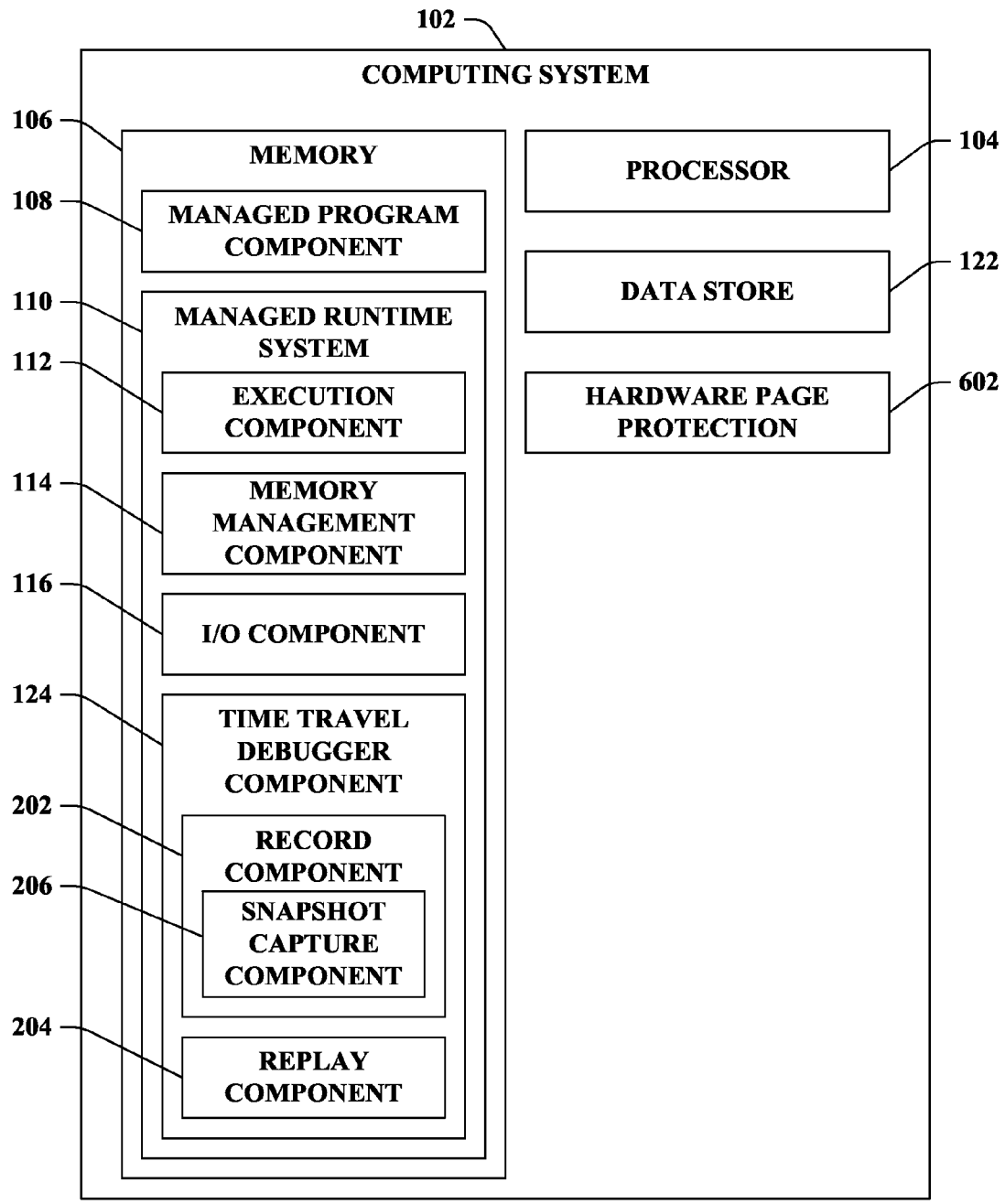
FIG. 6 illustrates a functional block diagram of an exemplary computing system that includes hardware page protection.

Pursuant to another example (which can similarly allow for generational optimization), rather than the memory management component 114 including the write barrier component 506, hardware page protection can be utilized by the managed runtime system 110 to lazily take live-object snapshots of the old space. FIG. 6 depicts the computing system 102 including hardware page protection 602. The hardware page protection 602 can protect pages in the old space in the memory 106. The hardware page protection 602 can perform a copy-on-write live-object snapshot on a page in the old space (e.g., created subsequent to a last snapshot in the sequence, when a fault occurs, etc.). Moreover, the snapshot capture component 206 can capture a snapshot (e.g., a next snapshot in the sequence subsequent to the copy of the page being created by the hardware page protection 602). Such snapshot can be captured by the snapshot capture component 206 recording live objects in the nursery as part of the snapshot and recording the copy of the live-object page as part of the snapshot. Thus, the managed runtime system 110 (e.g., the snapshot capture component 206) can use the hardware page protection 602 to lazily take snapshots of the old space by protecting pages in the old space at snapshot time, and then lazily performing a copy-on-write live-object snapshot when a fault occurs.

Reference is again made to FIG. 5. Additional Exemplary Modifications are set forth below.

Exemplary Modification 3: Snapshot Compression.

The snapshot capture component 206, according to Exemplary Modification 3, includes a compression component 510 that compresses a snapshot of the heap 118 before saving the snapshot to a data store (e.g., the data store 122). The compression component 510 can run a lossless compression algorithm on a live memory buffer. For example, the snapshot capture component 206 can write a snapshot of the program state to a buffer, the compression component 510 can run the lossless compression algorithm on the buffer, and the compressed snapshot can thereafter be saved to the data store (e.g., via the I/O component 116). Thus, the compression component 510 can reduce a cost of writing this data to disk and an amount of data to be written. It is contemplated, for example, that the compression and write operations can be offloaded to a helper thread (e.g., when spare computational resources, such as an idle processor core, etc. are available); yet, the claimed subject matter is not so limited.

According to an example, in the managed runtime system 110 as described in Exemplary Modification 3, the time travel debugger component 124 can capture and replay execution using live-object snapshots. By way of another example, in the managed runtime system 110 as described in Exemplary Modification 3, the time travel debugger component 124 can capture and replay execution using page-level snapshots.

Exemplary Modification 4: Dynamic Interval Adjustment.

According to Exemplary Modification 4, the snapshot capture component 206 includes an interval adjustment component 512 that dynamically adjusts the snapshot interval at which the snapshots of the program state of the managed program component 108 are sequentially recorded by the snapshot capture component 206. The snapshot interval can be dynamically adjusted during the execution of the managed program component 108. For instance, even with other modifications described above, the overhead of extracting snapshots at a fixed rate (SNP_INTERVAL on line 6 in Algorithm 1) may incur significant overhead. To control the cost of the time travel debugger component 124 (e.g., provide for the overhead remaining near a given target fraction of execution time $cost_{trgt}$), the interval adjustment component 512 can control the snapshot interval.

According to an example, the interval adjustment component 512 can include a proportional controller. Following this example, the interval adjustment component 512 can initially set the dynamic snapshot interval as $t_{snp}$=SNP_INTERVAL. Moreover, the interval adjustment component 512 can enforce lower and upper limits on sample rate to mitigate snapshot intervals below a low threshold or above a high threshold. Thus, the interval adjustment component 512 can enforce $t_{snp} \in [l, u]$, where l and u are the lower and upper limits on the sample rate, respectively. At each snapshot, the interval adjustment component 512 can use a timer, $cost_{est}$, to estimate time spent in snapshot overhead. Further, the interval adjustment component 512 can update the dynamic snapshot interval as $t_{snp}$=K*($cost_{trgt}$−$cost_{est}$)+SNP_INTERVAL. The interval adjustment component 512, for instance, can periodically update the dynamic snapshot interval (e.g., update every second, etc.). In accordance with an exemplary implementation, $cost_{trgt}$=0.1 can be used for an approximate target overhead rate of 10% and K=−2.5 for the gain value as a balance between stability and response to changing program behavior; yet, the claimed subject matter is not so limited.

Pursuant to other examples, the interval adjustment component 512 can include other types of controllers other than a proportional controller. Moreover, it is contemplated that the interval adjustment component 512 can dynamically adjust the snapshot interval based on one or more other features in addition to or instead of time spent in snapshot overhead. Examples of other features include, but are not limited to, estimated live-heap size, mutation rate, allocation rate, and the like.

According to an example, in the managed runtime system 110 as described in Exemplary Modification 4, the time travel debugger component 124 can capture and replay execution using live-object snapshots. By way of another example, in the managed runtime system 110 as described in Exemplary Modification 4, the time travel debugger component 124 can capture and replay execution using page-level snapshots.

Again, it is noted that one or a combination of the aforementioned Exemplary Modifications can be implemented for the managed runtime system 110. Moreover, it is to be appreciated that the managed runtime system 110 need not be modified in accordance with any of the foregoing Exemplary Modifications.

Figure 7:
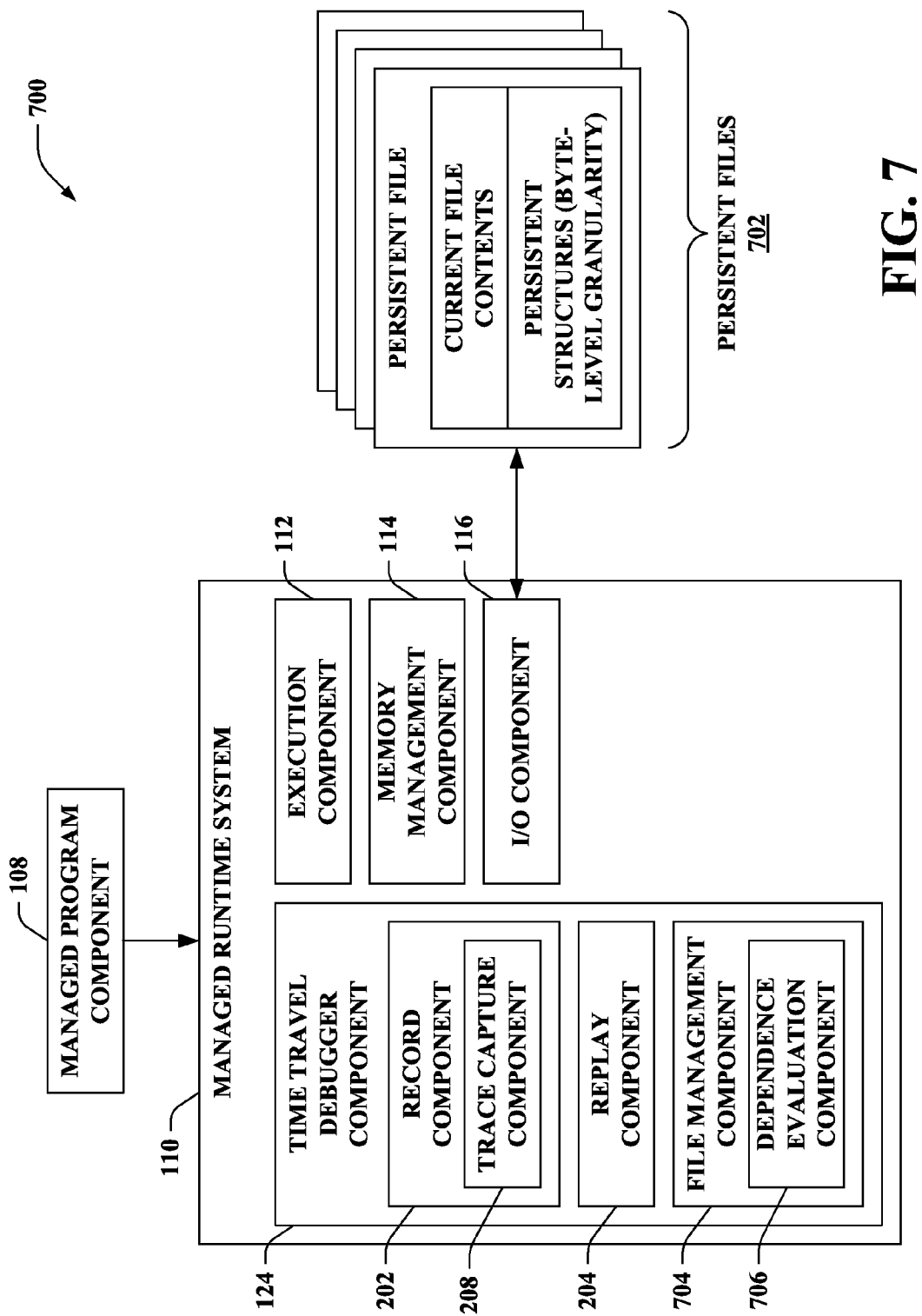
FIG. 7 illustrates a functional block diagram of an exemplary system that maintains persistent file content for time travel debugging.

With reference to FIG. 7, illustrated is a system 700 that maintains persistent file content for time travel debugging. The system 700 includes the managed program component 108 and the managed runtime system 110. The managed runtime system 110 includes the execution component 112, the memory management component 114, the I/O component 116, and the time travel debugger component 124.

The time travel debugger component 124 can perform record-replay time travel debugging; accordingly, the time travel debugger component 124 can include the record component 202 and the replay component 204. The record component 202 can further include the trace capture component 208 that traces external interactions during execution of the managed program component 108 and logs values received during the trace (e.g., as part of the log data 128). Pursuant to the example set forth in FIG. 7, the trace capture component 208 need not trace file I/O during execution of the managed program component 108 (e.g., the trace capture component 208 can trace external interactions other than file I/O, etc.).

Pursuant to an illustration, it is contemplated that the trace capture component 208 can log values received from an external environment during forward execution of the managed program component 108; then, during replay, the replay component 204 can read values from the log data (e.g., the log data 128). For low bandwidth sources, the foregoing approach can have a low overhead. Yet, such approach may not scale to high bandwidth external event sources, like the filesystem, where logging bytes read/written can generate significant log files and overhead. Accordingly, the file management component 704 can handle filesystem operations based on semantic information present in the managed runtime system 110 along with library semantics.

The system 700 further includes persistent files 702. According to an example, the persistent files 702 can be retained in a data store (e.g., the data store 122). Additionally or alternatively, the persistent files 702 (or a portion thereof) can be retained in memory (e.g., the memory 106). The managed program component 108 can interact with the persistent files 702 during execution (e.g., performed by the execution component 112).

Moreover, the time travel debugger component 124 (or the managed runtime system 110 generally) can include a file management component 704 that manages storage and retrieval of contents of the persistent files 702. A persistent file (e.g., one of the persistent files 702) includes current file contents and persistent structures. The persistent structures include a history of previous versions for bytes written to the persistent file during the execution of the managed program component 108.

The managed program component 108 may interact with a file in one of three modes: read-only, write-only, or both read and write. It is observed that (1) data the managed program component 108 reads from a file already exists on the filesystem and (2) values written are, by construction, deterministic during replay. Thus, reads and writes to a file, so long as they are not intermixed, do not need to be logged. When a file is exclusively read or written, then closed, and later reopened for writing, the original file can be copied before allowing writes to the file. Accordingly, some file operations need not be logged; for example, a capture of operations can be obtained for files that are both read and written under a single open, while other file operations need not be logged.

For the intermixed read-write case (e.g., where a file is read and written), a persistent file can be constructed by the file management component 704. The persistent file supports fine-grained access (e.g., with byte-level granularity) to any version of the file during execution of the managed program component 108; thus, the file management component 704 can access (e.g., during replay of the execution) the persistent file to retrieve a version of the file at a given time during the execution of the managed program component 108. The persistent file can also identify parts of the file that represent program dependencies.

As noted above, a primary on-disk copy of a persistent file can include current file contents and persistent structures that includes the history of previous versions for bytes written to the persistent file. The persistent structures can enable later access to any previous version of the persistent file. When integrated with time travel debugger component 124, reverse execution performed by the replay component 204 becomes reading values from the appropriate version of the persistent structure. Thus, at least a portion of the execution of the managed program component 110 can be replayed (e.g., by the replay component 204) based upon the history of the previous versions for the bytes written to the persistent file during the execution of the managed program component 108. Moreover, the persistent structures can enable virtualization of the file system for the time travel debugger component 124.

The following persistent structures can encode file contents as well as read/write dependencies as they appear at steps in the execution of the managed program component 108.

PFile::={Dictionary<long, PBlock>map; File f;}
PBlock::={Tuple<long, byte>[512] buff; PBlock next;}

When a file is opened for writing, the file management component 704 can create a PFile entry for it with a map of null entries. The map can be a Dictionary because file writes are generally sparse. When the file is closed, the file management component 704 can copy the file along with its PFile data into a temporary directory. For writes to a given position in the file, pos, a new PBlock entry may be created to represent the old version of the file. Algorithm 4 depicts an exemplary algorithm for writing the persistent file structure.

Algorithm 4: PersistentFileWriteBase

Input: PFile pf  // the persistent file to update
Input: long pos  // the file offset
Input: char c  // the byte to write
1 bpos ← pos/512;
2 cpos ← pos % 512;
3 if pf.map[bpos] = null ∨ pf.map[bpos].buff[cpos].Item1 ≠ 0 then
4   buff ← newTuple<long,byte>[512];
5   pb ← new PBlock(buff,pf.map[bpos]);
6   pf.map[bpos] ← Pb;
7 origc ← pf.f.ReadFromPos(pos);
8 pf.f.WriteAtPos(c,pos)
9 pf.[bpos].buff[cpos] ← (TraceTime,origc);

Algorithm 4 creates a new PBlock, writes TraceTime and the about-to-overwritten character (origc) from the file on disk into the new PBlock, sets it to the head of the list at cpos, then overwrites the character in the file.

A read performed by the file management component 704 can convert a file offset, or position, into a block index as in the write algorithm. If the resulting PBlock list is null, the underlying file is directly read by the file management component 704. Otherwise, the list of PBlock entries is walked. A value of the first PBlock whose time is non-zero and greater than the current TraceTime can be returned. If the end of the list is reached, data can be directly read from the file.

By construction, the primary on-disk copy of a persistent file includes the current file contents. Thus, it is possible to perform time travel debugging when multiple processes (even processes that are not time travel debugging (TTD)-aware) are accessing the same set of files simultaneously. According to an example, an operating system can notify a TTD-aware application that a file modification is about to occur, thereby enabling the PFile structures to be updated (e.g., by the file management component 704).

By way of another example, a file system broker can be used to enable debugging multiple TTD processes and non-TTD processes (which read from shared files) simultaneously. When a TTD process modifies a file, it notifies the broker, which generates a global modification time and sends a message, ⟨char,pos,time⟩. The message can cause the TTD processes to update PFile information as needed. Extending the broker to push debugger step/reverse step commands to other TTD processes in file timestamp order enables the various TTD processes to remain synchronized during debugging, up to the reorderings of local process events that respect the order of file system events.

Use of the persistent files 702 managed by the file management component 704 can enable reconstructing the state of the filesystem at any point in the execution of the managed program component 108. According to an example, the file management component 704 can log data-dependence-free writes in a persistent file. Pursuant to another example, old contents of a file can be preserved by the file management component 704 if they were read (e.g., by the managed program component 108 during execution); otherwise, such contents need not be preserved by the file management component 704. Following the foregoing example, the file management component 704 can further include a dependence evaluation component 706 that employs awareness of writes that are free of data dependencies and duplicate writes that need not be versioned in the persistent structures of the persistent files 702.

The PFile structure can enable tracking upper and lower bounds (maxpos and minpos) of file positions that the managed program component 108 reads during execution.

PFile::={long minpos, maxpos; . . . }

Thus, the persistent structure can include a range of previously read file positions (e.g., previously read during the execution of the managed program component 108). Initially both values can be set to −1. During the execution of the managed program component 108 and responsive to a read operation at a read position pos in the persistent file, the dependence evaluation component 706 can adjust the range of the previously read file positions to include the read position pos in the persistent file.

Further, during the execution of the managed program component 108 and responsive to a write operation at a write position pos in the persistent file, the dependence evaluation component 706 can identify whether the write position pos is within the range of the file positions previously read during the execution of the managed program component 108. Thus, the write algorithm can first check if the write file position pos is outside the range of used file positions pos∈[minpos; maxpos]. If the write file position pos is outside the range, then it is determined to not have been read and the old value can be overwritten. Accordingly, if the write file position pos is identified by the dependence evaluation component 706 as being outside the range of the file positions, then the file management component 704 can overwrite the old value at the file position in the current file contents without writing the old value at the file position to the persistent structure. Alternatively, if the write file position pos is identified by the dependence evaluation component 706 as being within the range of the file positions, then the file management component 706 can write the old value at the file position to the persistent structure and can overwrite the old value at the file position in the current file contents.

According to another example, the dependence evaluation component 706 can use a conditional guarding the creation of a new PBlock can to check whether the new and old values are identical, pf.map[bpos].buff[cpos].Item2=c. If the values are the same, then the file management component 704 need not update the persistent structure.

Various filesystem name and position operations can be performed by the file management component 704. The filesystem operations can be managed using a combination of logging and creation of a set of temporary files, which can be guided by high-level library semantics of the operations. Below are examples of some conventional directory operations and corresponding extensions supported by the file management component 704 for time travel debugging:

Delete(string fn) ⇒ Move fn to a fresh name.
CreateNew(string fn) ⇒ Log create of fn.
Copy(string src, string dst) ⇒ Move dst to a fresh name.
Seek(File f, long pos) ⇒ Log previous position.
Length(File f) ⇒ Log returned size.

The logged information enables the foregoing filesystem operations to be reversed. For example, the reverse of the Delete includes copying the file back from the temporary file in the log. Thus, for each API call that may modify the file system, code can be added to revert the effect of the operation using the data in the log.

Moreover, the trace capture component 208 of the time travel debugger component 124 can handle other external events (other than file I/O), such as interrupts, console interaction, network I/O, thread switches, etc., via logging. For each of these external events, the trace capture component 208 can cause the I/O component 116 to timestamp and append the event to a log (e.g., the log data 128). The log provides data for reverting file system state and deterministically replaying the external inputs seen by the managed program component 108 during re-execution (e.g., performed by the replay component 204 and the execution component 112).

Below, various examples of external events that can be logged by the trace capture component 208 and used by the replay component 204 are described. It is to be appreciated, however, that the claimed subject matter is not so limited.

According to an example, various I/O events and NOOP-able calls can be logged by the trace capture component 208. During replay, input events, such as receiving a network packet or getting a current time, can be implemented by reading and returning the data from the log. Further, the replay component 204 can convert output events that are non-idempotent or redundant, such as network sends or timer registration, into NOOPs (no operation) and update the state of the environment as needed (e.g. writing to the console (user interface)).

By way of another example, threads and asynchronous events can be logged by the trace capture component 208. Scheduling related events, such as thread switches or interrupts which trigger event handlers, can be handled via a uniprocessor execution model and the information in the event log. The uniprocessor model multiplexes threads on a single logical CPU (even if multiple CPUs are available). The foregoing can mitigate thread races during the execution of the managed program component 108 aside from those that are due to explicit context switches. Thus, replaying these explicit thread context switches recorded in the log can provide deterministic re-execution of the managed program component 108.

By way of another example, the managed runtime system 110 may expose mechanisms that allow the managed program component 108 to call arbitrary native methods. Accordingly, native calls that do not mutate environmental state, such as files or UI, that are also accessed from within the managed runtime system 110 can be used with the time travel debugger component 124. The foregoing can mitigate side-effects to the external state of which the time travel debugger component 124 is unaware.

During execution, the result values of native invocations can be stored in the event log. When snapshots are taken or restored, for some native methods, the referenced data may be unable to be serialized or restored. Accordingly, at snapshot time, memory pointed to by these references can be ignored; at restore time, the native pointer values can be stored into an array for access during replay. Native invocations become NOOPs during replay that return the value produced during forward execution from the log. Thus, time-travel over native invocations can be supported at the cost logging return values during forward execution.

Figure 8:
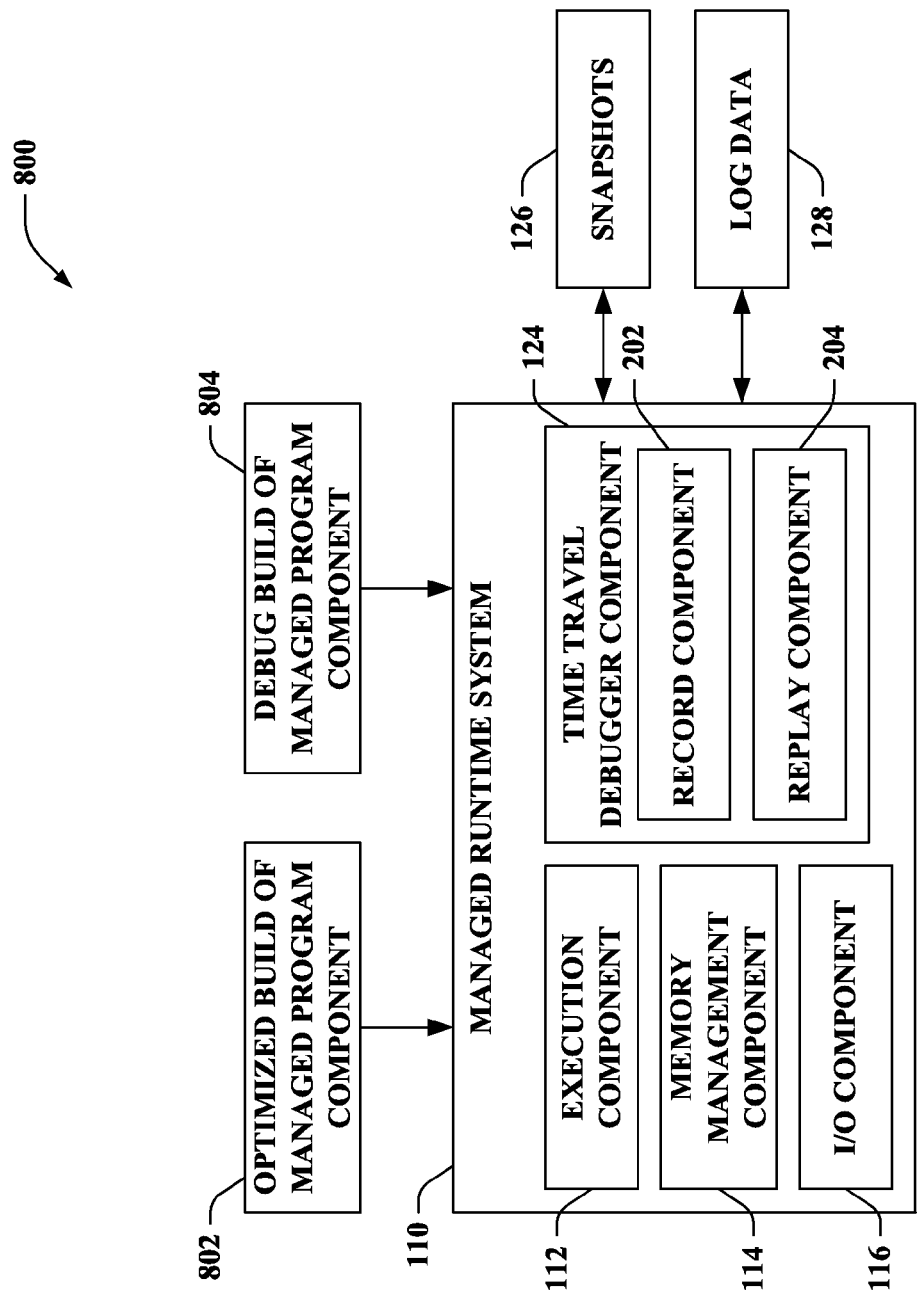
FIG. 8 illustrates a functional block diagram of an exemplary system that supports recording snapshots of program states during execution of an optimized build of a managed program component and using the snapshots with a debug build of the managed program component for replay as part of time travel debugging.

With reference to FIG. 8, illustrated is a system 800 that supports recording the snapshots 126 of the program states (and the log data 128) during execution of an optimized build 802 of a managed program component and using the snapshots 126 (and the log data 128) with a debug build 804 of the managed program component for replay as part of time travel debugging. Accordingly, the snapshots 126 and the log data 128 can be swapped between builds of the managed program component (e.g., the managed program component 108).

Debugging the debug build 804 of a managed program component can provide that, at each step in the execution, the values in home locations of local and global variables are consistent with a source-level view of the managed program component. However, various program optimizations may not be used with the debug build 804, including method inlining, copy-propagation, deadstore elimination, or home-location reuse. To mitigate the foregoing, the system 800 enables full-fidelity source-level time travel debugging of the debug build 804 $p_d$, while executing the optimized build 802 $p_o$.

More particularly, the execution component 112 can execute the optimized build 802 $p_o$ of the managed program component. The time travel debugger component 124 (e.g., the record component 202) can record the sequence of snapshots 126 (e.g., live-object snapshots, page-level snapshots, etc.) during the execution of the optimized build 802 $p_o$. Moreover, the log data 128 can be recorded during the execution of the optimized build 802 $p_o$. The time travel debugger component 124 can further identify a breakpoint or an exception during the execution of the optimized build 802 $p_o$. Thus, the debugger and replay component 204 can be launched responsive to the identification of the breakpoint or the exception.

The time travel debugger component 124 (e.g., the replay component 204) can restore a program state of a selected snapshot that precedes the breakpoint or the exception. Further, the time travel debugger component 124 can cause the execution component 112 to execute the debug build 804 $p_d$ based upon the program state as restored from the selected snapshot. Moreover, the time travel debugger component 124 can replay at least a portion of the execution of the debug build 804 $p_d$. Thus, in the system 800, replay can start from the snapshots 126 taken from the optimized execution (e.g., execution of the optimized build 802 $p_o$) against the debug build 804 $p_d$ (rather than using the snapshots 126 with the optimized build 802 $p_o$ for replay).

Accordingly, the system 800 can support running the optimized build 802 $p_o$ until a breakpoint or an exception, when replay reconstructs the full source-level view of the program state in the debug build 804 $p_d$. Thus, in the system 800, a snapshot and the log data 128 recorded during execution of the optimized build 802 $p_o$ can later be used with the debug build 804 $p_d$.

According to an example, Algorithm 1 introduces three classes of snapshot points (e.g., loop headers, procedure calls, and allocation operations) where snapshots are conditionally taken. To swap snapshots and logs between different builds of the managed program component, executions of the builds are to be convertible. More particularly, a snapshot from the optimized build 802 $p_o$ taken at a snapshot safe point can be used in the debug build 804 $p_d$ based upon the following conditions.

1. Calls to built-in procedures and TraceTime operations are not reordered or moved over a snapshot point in $p_o$;
2. The arguments to built-in procedure calls in $p_o$ and $p_d$ are identical;
3. Stores to the heap are not removed or moved over a snapshot point in $p_o$; and
4. At snapshot safe points, and for procedure call locations that may transitively reach the safe points, the compiler has constructed a recovery map for each local and global variable in $p_d$ based on state values in $p_o$.

The first two conditions provide that the logs are identical, and synchronize the TraceTime timestamps; these conditions mitigate reordering or argument changes to operations that writes to the event log or updates the TraceTime timestamp. The third condition provides that heap objects are identical across the optimized snapshot and its corresponding snapshot in the debug build 804. The fourth condition allows the compiler to perform optimizations that may result in a location not including a particular variable value as long as it provides a function to reconstruct the value for the variable. According to another example, instead of the fourth condition, the optimized build 802 $p_o$ can store local and global variables to home locations before each snapshot safe point.

These conditions provide that the snapshots 126 from the optimized build 802 can be used in the debug build 804. A compiler that generates the optimized build 802 and the debug build 804 of the managed program component can enforce the conditions.

The following exemplary scenarios generally pertain to the time travel debugging described herein. It is to be appreciated, however, that the claimed subject matter is not limited to the following exemplary scenarios. According to an exemplary scenario, TTD functionality can be built into a core of a managed OS, which can enable lightweight TTD augmented with awareness of OS events and, therefore, the ability to synchronize over communication channels. Pursuant to another exemplary scenario, a managed runtime system that provides low overhead, deterministic replay for concurrent programs can be utilized with the TTD functionality described herein. According to another exemplary scenario, full tracing can be used to capture and reverse sequences of events that occur in a native call. Again, it is to be noted that the claimed subject matter is not limited to the foregoing exemplary scenarios.

Figure 9:
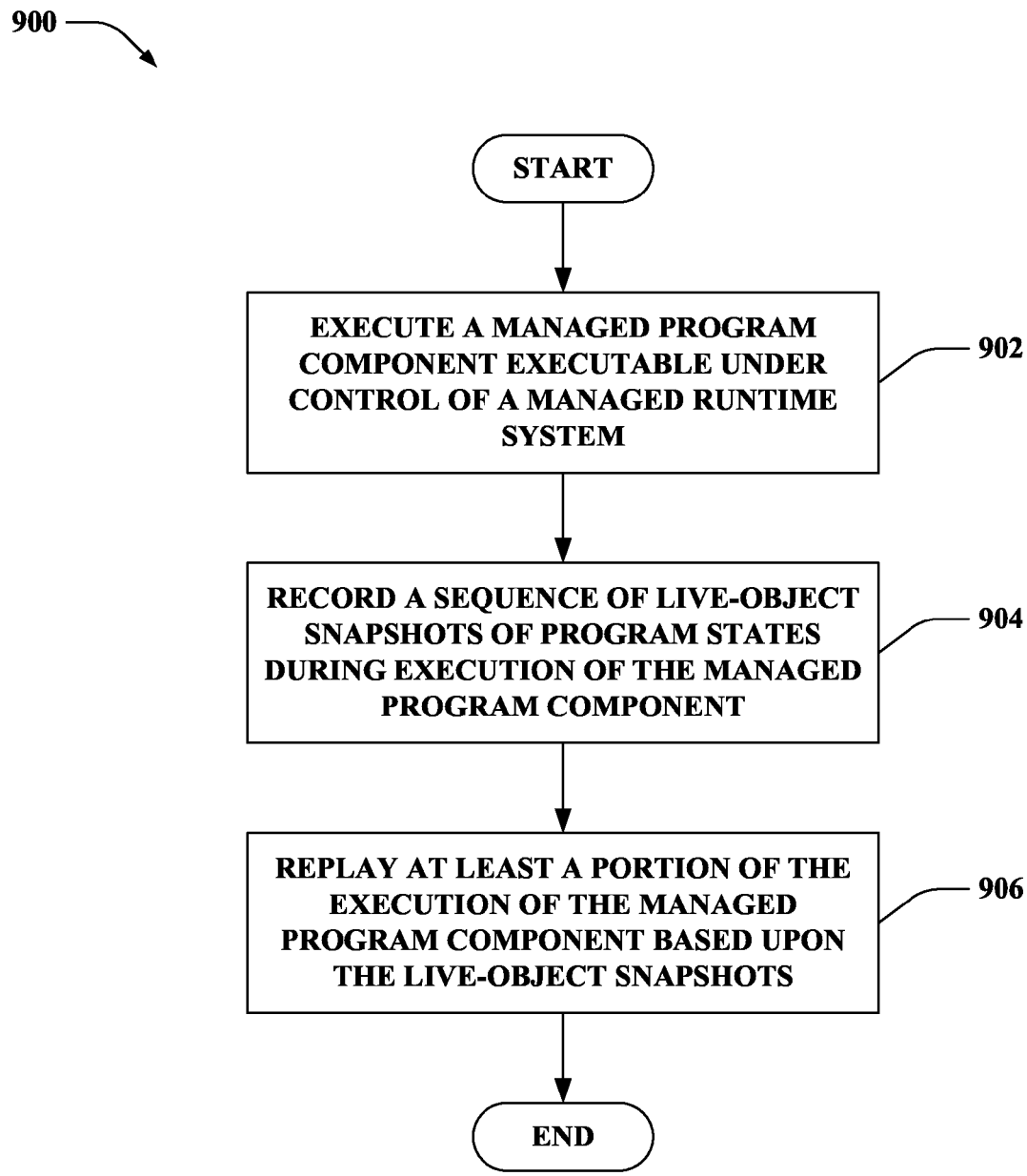
FIG. 9 is a flow diagram that illustrates an exemplary methodology of performing time travel debugging in a managed runtime system.
Figure 10:
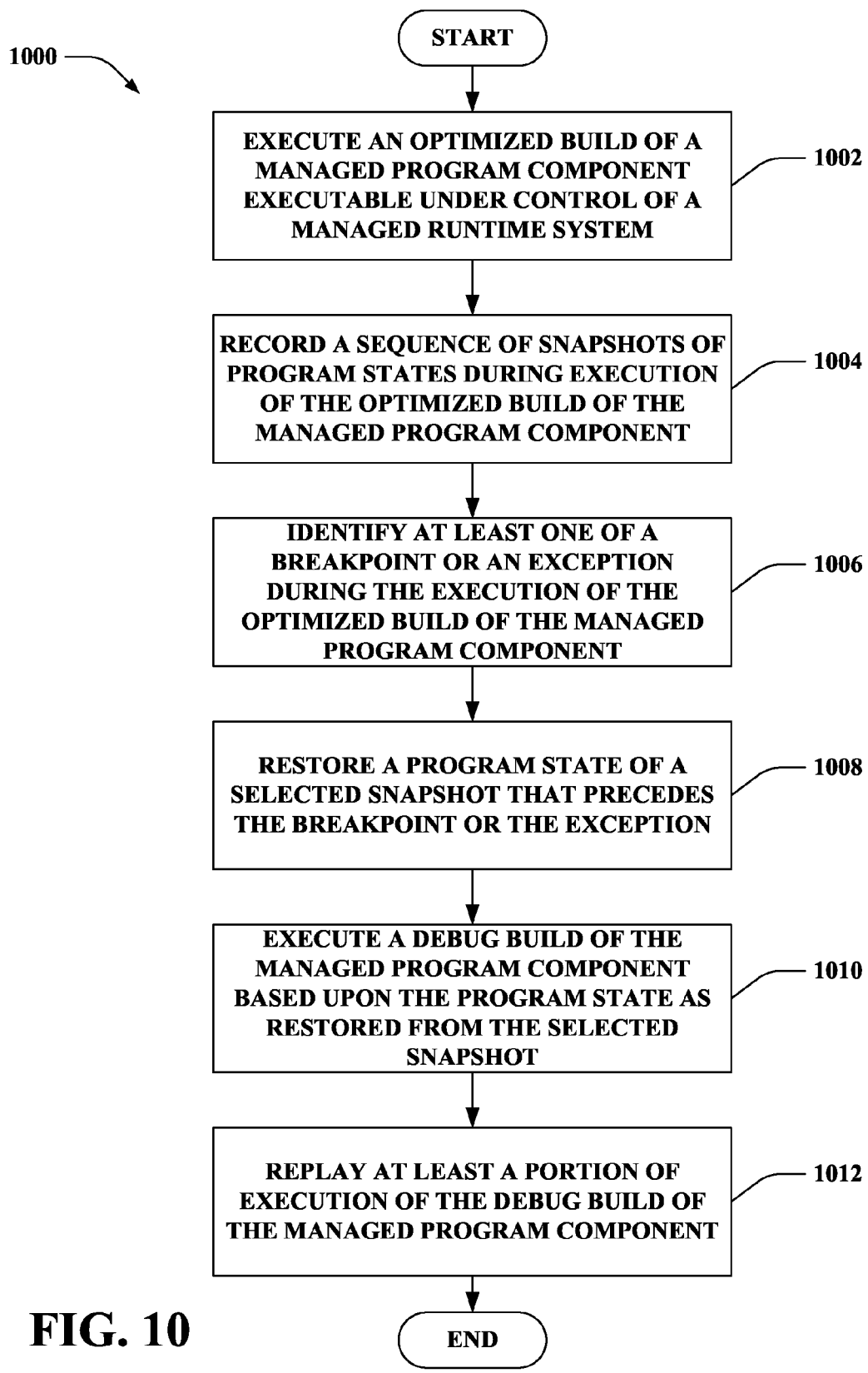
FIG. 10 is a flow diagram that illustrates an exemplary methodology of swapping program states between differing builds of a managed program component to perform time travel debugging in a managed runtime system.
Figure 11:
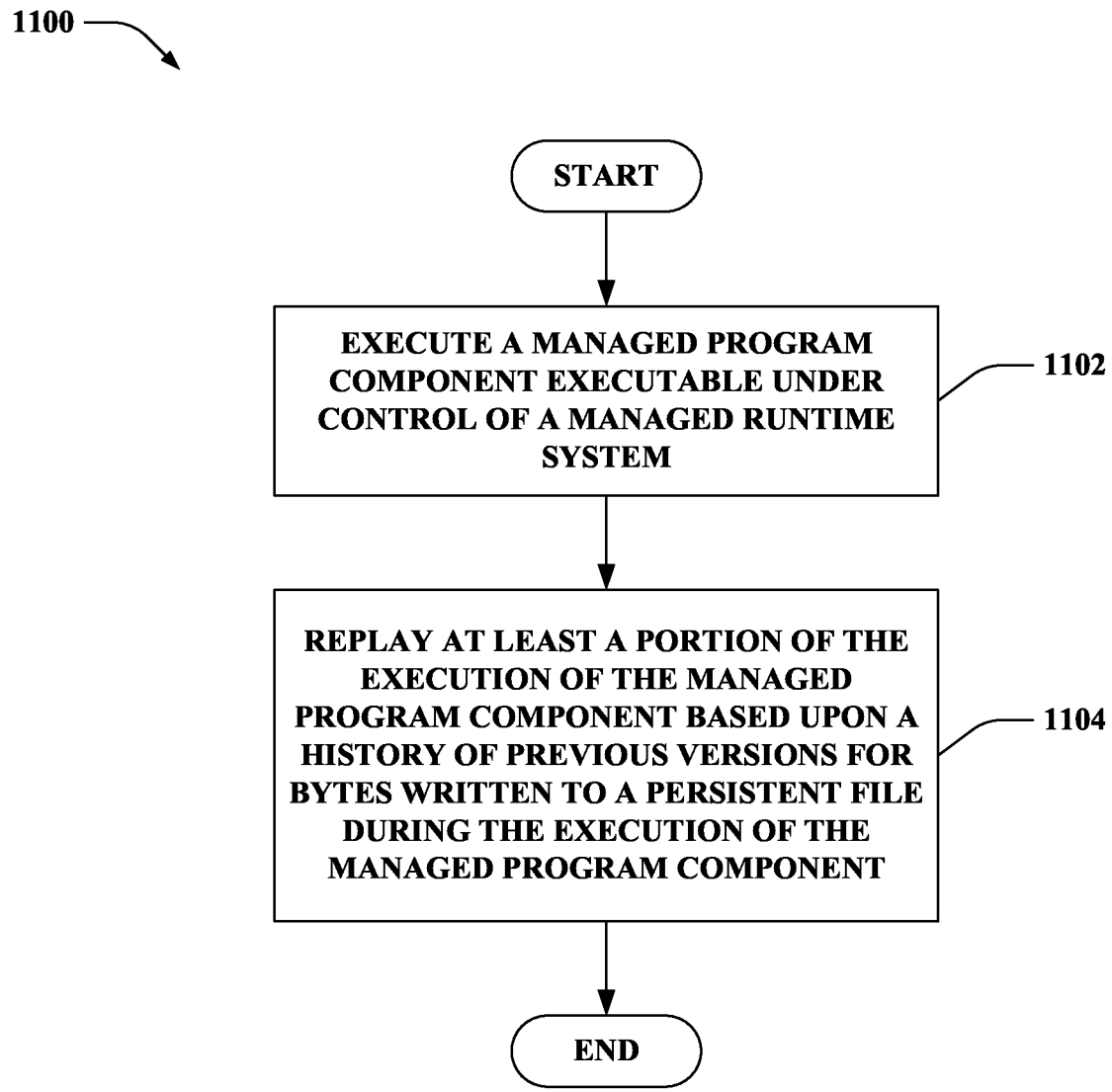
FIG. 11 is a flow diagram that illustrates an exemplary methodology of performing time travel debugging in a managed runtime system.

FIGS. 9-11 illustrate exemplary methodologies relating to performing time travel debugging in a managed runtime system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 9 illustrates a methodology 900 of performing time travel debugging in a managed runtime system. At 902, a managed program component can be executed. The managed program component can be executable under control of the managed runtime system. At 904, a sequence of live-object snapshots of program states can be recorded during execution of the managed program component. A live-object snapshot can include live objects from a heap in a memory at a given time during the execution. At 906, at least a portion of the execution of the managed program component can be replayed based upon the live-object snapshots. Replay of the execution of the managed program component can further be based upon log data from a trace of external interactions handled by the managed runtime system.

Turning to FIG. 10, illustrated is a methodology 1000 of swapping program states between differing builds of a managed program component to perform time travel debugging in a managed runtime system. At 1002, an optimized build of a managed program component can be executed. The optimized build can be executable under control of the managed runtime system. At 1004, a sequence of snapshots of program states can be recorded during execution of the optimized build of the managed program component. At 1006, at least one of a breakpoint or an exception can be identified during the execution of the optimized build of the managed program component. At 1008, a program state of a selected snapshot that precedes the breakpoint or the exception can be restored. At 1010, a debug build of the managed program component can be executed based upon the program state as restored from the selected snapshot. The debug build of the managed program component can be executable under control of the managed runtime system. At 1012, at least a portion of execution of the debug build of the managed program component can be replayed.

Now referring to FIG. 11, illustrated is a methodology 1100 of performing time travel debugging in a managed runtime system. At 1102, a managed program component can be executed. The managed program component can be executable under control of the managed runtime system. The managed program component can interact with a persistent file during execution. Moreover, the persistent file can include current file contents and persistent structures. The persistent structures can include a history of previous versions for bytes written to the persistent file during the execution of the managed program component. At 1104, at least a portion of the execution of the managed program component can be replayed based upon the history of the previous versions for the bytes written during the execution of the managed program component.

Figure 12:
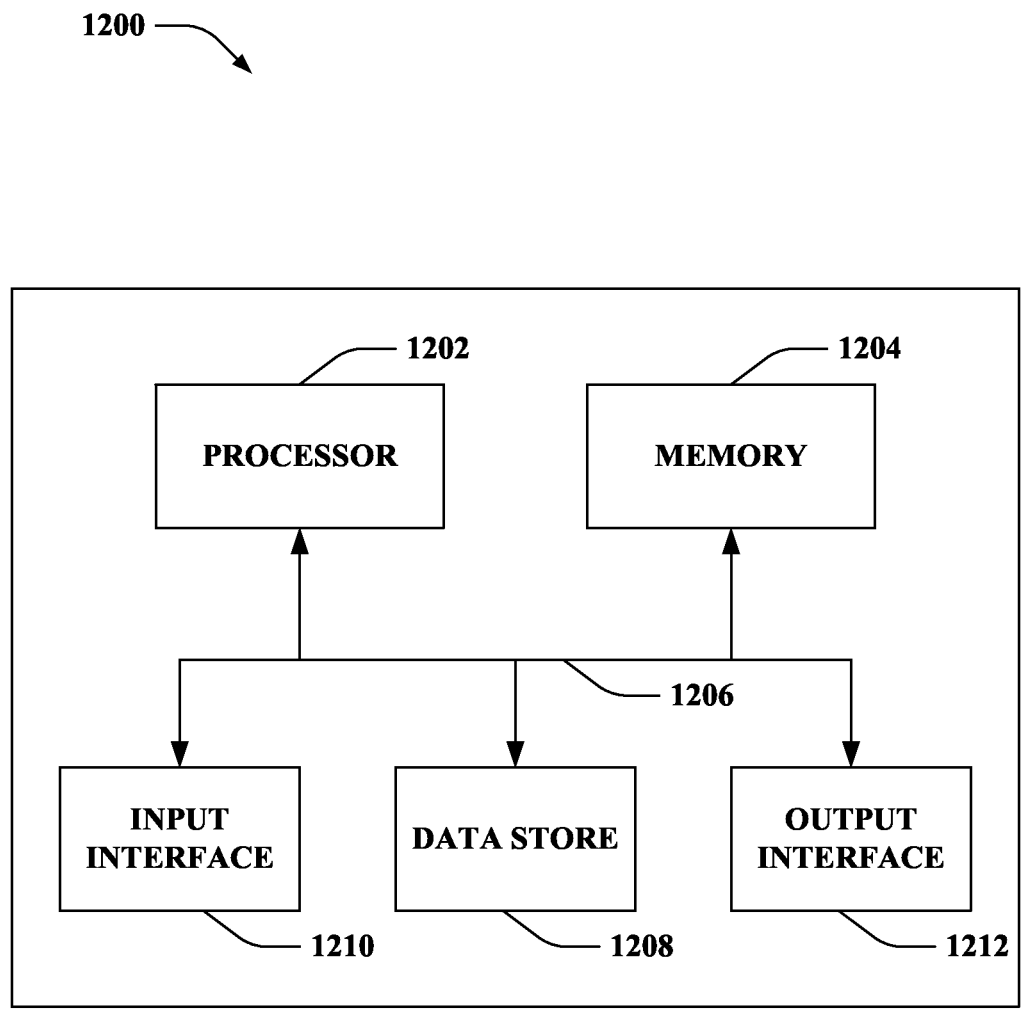
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 may be used in a system that performs time travel debugging of a managed program component in a managed runtime system. The computing device 1200 includes at least one processor 1202 that executes instructions that are stored in a memory 1204. The instructions may be, for instance, instructions for implementing functionality described as being carried out by one or more components discussed above or instructions for implementing one or more of the methods described above. The processor 1202 may access the memory 1204 by way of a system bus 1206. In addition to storing executable instructions, the memory 1204 may also store a call stack, a heap, persistent files (or portions thereof), snapshots, log data, and so forth.

The computing device 1200 additionally includes a data store 1208 that is accessible by the processor 1202 by way of the system bus 1206. The data store 1208 may include executable instructions, snapshots, log data, persistent files, etc. The computing device 1200 also includes an input interface 1210 that allows external devices to communicate with the computing device 1200. For instance, the input interface 1210 may be used to receive instructions from an external computer device, from a user, etc. The computing device 1200 also includes an output interface 1212 that interfaces the computing device 1200 with one or more external devices. For example, the computing device 1200 may display text, images, etc. by way of the output interface 1212.

It is contemplated that the external devices that communicate with the computing device 1200 via the input interface 1210 and the output interface 1212 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1200 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1200 may be a distributed system. Thus, for instance, several devices may be in communication by way of a network connection and may collectively perform tasks described as being performed by the computing device 1200.

Figure 13:
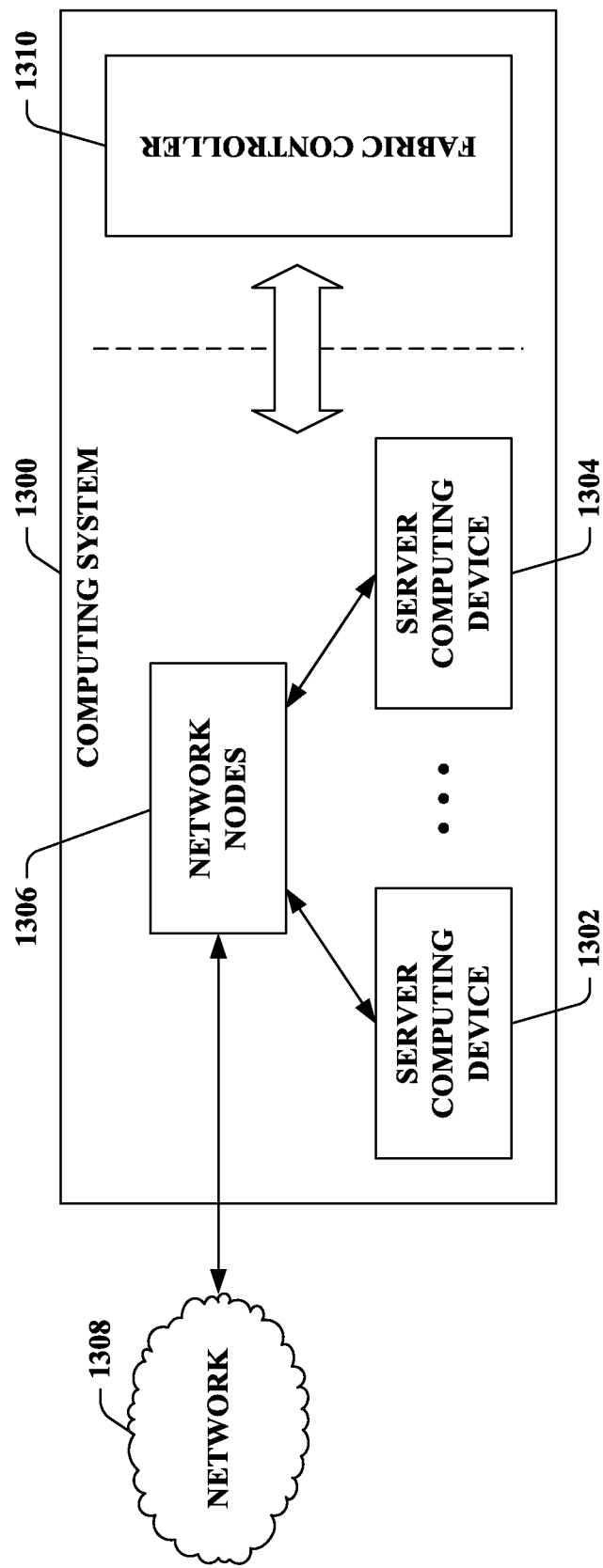
FIG. 13 illustrates an exemplary computing system.

Turning to FIG. 13, a high-level illustration of an exemplary computing system 1300 that can be used in accordance with the systems and methodologies disclosed herein is illustrated. For instance, the computing system 1300 can be or include the computing system 102. Additionally or alternatively, the computing system 102 can be or include the computing system 1300.

The computing system 1300 includes a plurality of server computing devices, namely, a server computing device 1302, . . . , and a server computing device 1304 (collectively referred to as server computing devices 1302-1304). The server computing device 1302 includes at least one processor and a memory; the at least one processor executes instructions that are stored in the memory. The instructions may be, for instance, instructions for implementing functionality described as being carried out by one or more components discussed above or instructions for implementing one or more of the methods described above. Similar to the server computing device 1302, at least a subset of the server computing devices 1302-1304 other than the server computing device 1302 each respectively include at least one processor and a memory. Moreover, at least a subset of the server computing devices 1302-1304 include respective data stores.

Processor(s) of one or more of the server computing devices 1302-1304 can be or include the processor 104. Further, a memory (or memories) of one or more of the server computing devices 1302-1304 can be or include the memory 116. Moreover, a data store (or data stores) of one or more of the server computing devices 1302-1304 can be or include the data store 122.

The computing system 1300 further includes various network nodes 1306 that transport data between the server computing devices 1302-1304. Moreover, the network nodes 1302 transport data from the server computing devices 1302-1304 to external nodes (e.g., external to the computing system 1300) by way of a network 1308. The network nodes 1302 also transport data to the server computing devices 1302-1304 from the external nodes by way of the network 1308. The network 1308, for example, can be the Internet, a cellular network, or the like. The network nodes 1306 include switches, routers, load balancers, and so forth.

A fabric controller 1310 of the computing system 1300 manages hardware resources of the server computing devices 1302-1304 (e.g., processors, memories, data stores, etc. of the server computing devices 1302-1304). The fabric controller 1310 further manages the network nodes 1306. Moreover, the fabric controller 1310 manages creation, provisioning, de-provisioning, and supervising of virtual machines instantiated upon the server computing devices 1302-1304.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing system, comprising:
   at least one processor; and
   memory that comprises computer-executable instructions that, when executed by the at least one processor, cause the at least one processor to perform acts including:
   executing a managed program component, the managed program component being executed under control of a managed runtime system; and
   performing time travel debugging of the managed program component executed under control of the managed runtime system, wherein performing the time travel debugging comprises:
   recording a sequence of live-object snapshots of program states during execution of the managed program component, a live-object snapshot comprises live objects from a heap in the memory at a given time during the execution, and at least one dead object amongst the live objects in the heap is omitted from the live-object snapshot; and
   replaying at least a portion of the execution of the managed program component to enable forwards and backwards navigation through the execution of the managed program component from a target time, wherein replaying the portion of the managed program component comprises restoring a selected live-object snapshot from the sequence of live-object snapshots that precedes the target time and re-executing the managed program component from the selected live-object snapshot.

2. The computing system of claim 1, performing the time travel debugging further comprises performing copying traversal of the live objects in the heap at the given time during the execution to record the live objects as part of the live-object snapshot, wherein the at least one dead object amongst the live objects in the heap at the given time is omitted from the live-object snapshot by performing the copying traversal of the live objects.

3. The computing system of claim 2, performing the time travel debugging further comprises selectively controlling whether the copying traversal of the live objects in the heap is performed at the given time based on performance of a garbage collection.

4. The computing system of claim 1, performing the time travel debugging further comprises dynamically adjusting a time interval at which the live-object snapshots are sequentially recorded, the time interval being dynamically adjusted during the execution of the managed program component.

5. The computing system of claim 1, the memory further comprising computer-executable instructions that, when executed by the at least one processor, cause the at least one processor to perform acts including:
  performing a garbage collection to release portions of the memory for the at least one dead object in the heap and compact the live objects into a contiguous range in the memory, the garbage collection performed by the managed runtime system, performance of the garbage collection triggered based upon an amount of free memory in the heap and a remaining amount of time until the live-object snapshot is due to be captured, the live-object snapshot being a next live-object snapshot in the sequence;
  wherein performing the time travel debugging further comprises directly outputting the contiguous range in the memory that includes the live objects as at least part of the live-object snapshot, the contiguous range in the memory being directly outputted responsive to performance of the garbage collection.

6. The computing system of claim 1, wherein:
the heap is divided into a nursery and an old space; and
the memory further comprising computer-executable instructions that, when executed by the at least one processor, cause the at least one processor to perform acts including:
  tracking objects in the old space modified since a last live-object snapshot in the sequence utilizing a write barrier;
  wherein performing the time travel debugging further comprises capturing the live-object snapshot, capturing the live-object snapshot further comprises:
    performing copying traversal of live objects in the nursery of the heap at the given time during the execution to record the live objects in the nursery as part of the live-object snapshot; and
    recording, as part of the live-object snapshot, the objects in the old space indicated as being modified since the last live-object snapshot in the sequence.

7. The computing system of claim 1, wherein:
the heap is divided into a nursery and an old space; and
the memory further comprising computer-executable instructions that, when executed by the at least one processor, cause the at least one processor to perform acts including:
  performing a garbage collection to release portions of the memory for dead objects in the nursery and compact live objects in the nursery into a contiguous range in the memory, the garbage collection performed by the managed runtime system, performance of the garbage collection triggered based upon an amount of free memory in the heap and a remaining amount of time until the live-object snapshot is due to be captured, the live-object snapshot being a next live-object snapshot in the sequence; and
  tracking objects in the old space modified since a last live-object snapshot in the sequence utilizing a write barrier;
  wherein performing the time travel debugging further comprises capturing the live-object snapshot, capturing the live-object snapshot further comprises:
    responsive to performing the garbage collection, directly outputting the contiguous range in the memory that includes the live objects in the nursery as part of the live-object snapshot; and
    recording, as part of the live-object snapshot, the objects in the old space indicated as being modified since the last live-object snapshot in the sequence.

8. The computing system of claim 1, wherein the heap is divided into a nursery and an old space, the computing system further comprises:
  hardware page protection that protects pages in the old space, the hardware page protection performs a copy-on-write on a page in the old space to create the live-object snapshot of contents of the page, the live-object snapshot of the contents of the page created subsequent to a last live-object snapshot in the sequence;
  wherein performing the time travel debugging further comprises capturing the live-object snapshot, capturing the live-object snapshot further comprises:
    recording live objects in the nursery as part of the live-object snapshot; and
    recording the copy of the page as part of the live-object snapshot.

9. The computing system of claim 1, wherein:
the sequence of the live-object snapshots of the program states during the execution of the managed program component being recorded during execution of an optimized build of the managed program component; and
the execution of the managed program component being replayed utilizing a debug build of the managed program component with the live-object snapshots of the program states recorded during the execution of the first optimized of the managed program component.

10. The computing system of claim 1, wherein:
the managed program component interacts with a persistent file during the execution; and
the memory further comprising computer-executable instructions that, when executed by the at least one processor, cause the at least one processor to perform acts including:
  managing storage and retrieval of contents of the persistent file, the storage and the retrieval of the contents of the persistent file being managed by the managed runtime system, the persistent file comprises:
    current file contents; and
    persistent structures that comprise a history of previous versions for bytes written to the persistent file during the execution of the managed program component.

11. The computing system of claim 10, wherein managing the storage and the retrieval of the contents of the persistent file further comprises:
  identifying whether a write operation to a file position in the persistent file is within a range of file positions previously read during the execution of the managed program component;
  overwriting an old value at the file position in the current file contents if the file position is outside the range of the file positions; and
  writing the old value at the file position to the persistent structures and overwriting the old value at the file position in the current file contents if the file position is within the range of the file positions.

12. The computing system of claim 1, the memory further comprising computer-executable instructions that, when executed by the at least one processor, cause the at least one processor to perform acts including:
  performing a garbage collection utilizing a mark-region garbage collector, the garbage collection being performed by the managed runtime system, wherein at least a particular region is dense with live objects subsequent to performance of the garbage collection;
  wherein performing the time travel debugging further comprises capturing at least the particular region as part of the live-object snapshot responsive to the performance of the garbage collection.

13. The computing system of claim 1, performing the time travel debugging further comprises:
  capturing log data from a trace of external interactions handled by the managed runtime system between the live-object snapshots during the execution of the managed program component;
  wherein the portion of the execution of the managed program component is further replayed based upon the log data.

14. A method of performing time travel debugging in a managed runtime system, comprising:
  executing a managed program component, the managed program component being executable under control of the managed runtime system, the managed program component interacts with a persistent file during execution, the persistent file comprises current file contents and persistent structures that comprise a history of previous versions for bytes written to the persistent file during the execution of the managed program component;
  recording a sequence of live-object snapshots of program states during the execution of the managed program component, a live-object snapshot comprises live objects from a heap in memory at a given time during the execution, and at least one dead object amongst the live objects in the heap is omitted from the live-object snapshot; and
  replaying at least a portion of the execution of the managed program component to enable forwards and backwards navigation through the execution of the managed program component, the portion of the execution of the managed program component being replayed based upon:
    the history of the previous versions for the bytes written to the persistent file during the execution of the managed program component; and
    the live-object snapshots.

15. The method of claim 14, further comprising:
  during the execution of the managed program component and responsive to a write operation at a position in the persistent file:
    identifying whether the file position is within a range of file positions previously read during the execution of the managed program component;
    if the file position is identified as being within the range of the file positions:
      writing an old value at the file position to the persistent structures; and
      overwriting the old value at the file position in the current file contents; and
    if the file position is identified as being outside the range of the file positions:
      overwriting the old value at the file position in the current file contents without writing the old value at the file position to the persistent structures.

16. The method of claim 14, the persistent structures further comprise a range of previously read file positions, the method further comprising:
  during the execution of the managed program component and responsive to a read operation at a position in the persistent file;
  adjusting the range of the previously read file positions to include the position in the persistent file.

17. A method of performing time travel debugging in a managed runtime system, comprising:
  executing a managed program component, the managed program component being executable under control of the managed runtime system;
  recording a sequence of live-object snapshots of program states during execution of the managed program component, a live-object snapshot comprises live objects from a heap in memory at a given time during the execution of the managed program component, and at least one dead object amongst the live objects in the heap is omitted from the live-object snapshot;
  capturing log data from a trace of external interactions handled by the managed runtime system between the live-object snapshots during the execution of the managed program component; and
  replaying at least a portion of the execution of the managed program component to enable forwards and backwards navigation through the execution of the managed program component from a target time, wherein replaying the portion of the execution of the managed program component comprises:
    restoring a selected live-object snapshot from the sequence of the live-object snapshots that precedes the target time; and
    re-executing the managed program component from the selected live-object snapshot based on the external interactions from the log data.

18. The method of claim 17, further comprising:
performing a garbage collection; and
responsive to performance of the garbage collection, recording the live-object snapshot at the given time during the execution of the managed program component, a contiguous range in the memory that includes the live objects being recorded as at least part of the live object snapshot.

19. The method of claim 18, further comprising:
triggering the performance of the garbage collection based upon an amount of free memory in the heap and a remaining amount of time until the live-object snapshot is due to be captured, the live-object snapshot being a next live-object snapshot in the sequence.

20. The method of claim 17, further comprising:

performing copying traversal of the live objects in the heap at the given time during the execution of the managed program component to record the live objects as part of the live-object snapshot, wherein the at least one dead object amongst the live objects in the heap at the given time is omitted from the live-object snapshot by performing the copying traversal of the live objects.

* * * * *